United States Patent
Kobayashi

(10) Patent No.: US 12,499,517 B2
(45) Date of Patent: Dec. 16, 2025

(54) IMAGE PROCESSING APPARATUS, IMAGE PROCESSING METHOD, AND COMPUTER-READABLE MEDIUM

(71) Applicant: CANON KABUSHIKI KAISHA, Tokyo (JP)

(72) Inventor: Tsuyoshi Kobayashi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 18/169,262

(22) Filed: Feb. 15, 2023

(65) Prior Publication Data

US 2023/0206404 A1    Jun. 29, 2023

Related U.S. Application Data

(63) Continuation of application No. PCT/JP2021/031218, filed on Aug. 25, 2021.

(30) Foreign Application Priority Data

Aug. 26, 2020  (JP) ................................ 2020-143037
Jul. 28, 2021  (JP) ................................ 2021-123329

(51) Int. Cl.
  *G06T 5/70*  (2024.01)
  *G06T 5/50*  (2006.01)

(52) U.S. Cl.
  CPC .................. *G06T 5/70* (2024.01); *G06T 5/50* (2013.01); *G06T 2207/10116* (2013.01); *G06T 2207/20081* (2013.01); *G06T 2207/20084* (2013.01)

(58) Field of Classification Search
  CPC ... G06T 5/70; G06T 5/50; G06T 2207/10116; G06T 2207/20081; G06T 2207/20084;
  (Continued)

(56) References Cited

U.S. PATENT DOCUMENTS 4,369,367 A    1/1983   Horikawa
9,418,417 B2   8/2016   Kobayashi
(Continued)

FOREIGN PATENT DOCUMENTS

CN    103473745 A  * 12/2013 ........... G06T 11/008
CN    110517198 A  * 11/2019 ........... G06T 11/008
(Continued)

OTHER PUBLICATIONS

International Search Report issued by the Japan Patent Office on Oct. 5, 2021 in corresponding International Application No. PCT/JP2021/031218, with English translation.
(Continued)

*Primary Examiner* — Jose L Couso
(74) *Attorney, Agent, or Firm* — Carter, DeLuca & Farrell LLP

(57) ABSTRACT

An image processing apparatus is provided that includes: an obtaining unit is configured to obtain a first radiation image of an object to be examined; and a generating unit configured to, by inputting the first radiation image obtained by the obtaining unit into a learned model, generate a second radiation image in which noise is reduced compared to the first radiation image, wherein the learned model is obtained by training using training data that includes a radiation image obtained by adding noise with attenuated high-frequency components.

19 Claims, 20 Drawing Sheets

(58) Field of Classification Search
CPC ... G06T 5/60; G06T 1/00; G06T 2207/10101; G06T 2207/20182; G06T 5/00; G06T 5/90; G06T 7/0012; G06T 5/73; G06T 2207/10016; G06T 2207/30004; G06T 2207/20224; G06T 2207/10088; G06T 2207/30061; G06T 2207/10032; G06T 5/77; G06T 11/008; G06T 5/10; G06T 3/4046; G06T 9/002; G06T 2207/20076; A61B 6/585; A61B 6/4225; A61B 6/4233; A61B 6/5205; A61B 6/5258; A61B 3/0033; A61B 3/0066; A61B 5/7203; A61B 5/7221; A61B 5/7264; A61B 6/5217; A61B 6/5223; A61B 6/5269; G06F 2218/04; G06F 18/214; G06F 18/22; G06F 18/241; G06F 18/24; G06F 18/2411; G06F 18/2415; G06F 30/27; G06V 10/30; G06V 10/454; G06V 10/54; G06V 10/774; G06V 10/82; G06V 20/41; G06V 30/18057; G06V 20/698; G06V 30/19173; G16H 30/20; G16H 30/40; G16H 50/20; H04N 19/85; H04N 23/81; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; Y10S 128/925

See application file for complete search history.

(56) References Cited

U.S. PATENT DOCUMENTS

| | | | |
|---|---|---|---|
| 9,813,647 B2 | 11/2017 | Kobayashi | |
| 9,979,911 B2 | 5/2018 | Kobayashi | |
| 10,740,901 B2* | 8/2020 | Myronenko | G06F 18/211 |
| 11,295,158 B2 | 4/2022 | Kobayashi | |
| 2017/0135659 A1 | 5/2017 | Wang | |
| 2018/0017757 A1* | 1/2018 | Bohn | G02B 3/14 |
| 2018/0018757 A1 | 1/2018 | Suzuki | |
| 2018/0240219 A1* | 8/2018 | Mentl | G06N 3/08 |
| 2020/0065940 A1* | 2/2020 | Tang | G06F 18/214 |
| 2021/0042887 A1* | 2/2021 | Yoo | G06T 5/60 |
| 2021/0272336 A1* | 9/2021 | Yue | G06T 7/11 |
| 2021/0321963 A1* | 10/2021 | Manor | G06T 11/00 |
| 2022/0058423 A1 | 2/2022 | Kobayashi | |
| 2022/0172461 A1 | 6/2022 | Kobayashi | |
| 2022/0175331 A1 | 6/2022 | Kobayashi | |
| 2023/0033442 A1* | 2/2023 | Xiang | G06T 3/4053 |

FOREIGN PATENT DOCUMENTS

| | | | | |
|---|---|---|---|---|
| CN | 111047524 A * | 4/2020 | | G06N 3/045 |
| JP | S56-11394 A | 2/1981 | | |
| JP | 4679710 B2 | 4/2011 | | |
| JP | 2017-148125 A | 8/2017 | | |
| JP | 2018-038789 A | 3/2018 | | |
| JP | 2020005918 A * | 1/2020 | | G06T 5/10 |
| WO | 2019/240257 A1 | 12/2019 | | |

OTHER PUBLICATIONS

Mao, X.-J. et al., "Image Restoration Using Convolutional Autoencoders with Symmetric Skip Connections" arXiv:1606.08921v3 (Aug. 2016) pp. 1-17.

Office Action issued by the Indian Patent Office on Feb. 14, 2025 in corresponding IN Patent Application No. 202347014351, pp. 1-2, with English translation.

Notice of Reasons for Refusal issued by the Japanese Patent Office on Jun. 25, 2024 in corresponding JP Patent Application No. 2021-123329, with English translation.

International Report on Patentability issued in corresponding International Application No. PCT/JP2021/031218 dated Mar. 9, 2023, pp. 1-6, English Translation.

Indian Office Action issued on Oct. 27, 2023 in corresponding IN Patent Application No. 202347014351.

Decision to Grant a Patent issued by the Japanese Patent Office on Sep. 3, 2024 in corresponding JP Patent Application No. 2021-123329, pp. 1-5, with English translation.

Lee, E. et al., "Wiener Filtering Using Object and Noise Power Spectra for CsI(TI)-Scintillator Radiography Detectors" 2020 International Conference on Electronics, Information, and Communication (ICEIC), IEEE (Jan. 2020) pp. 1-4.

Extended European Search Report issued by the European Patent Office on Jul. 9, 2024 in corresponding EP Patent Application No. 21861633.2.

* cited by examiner

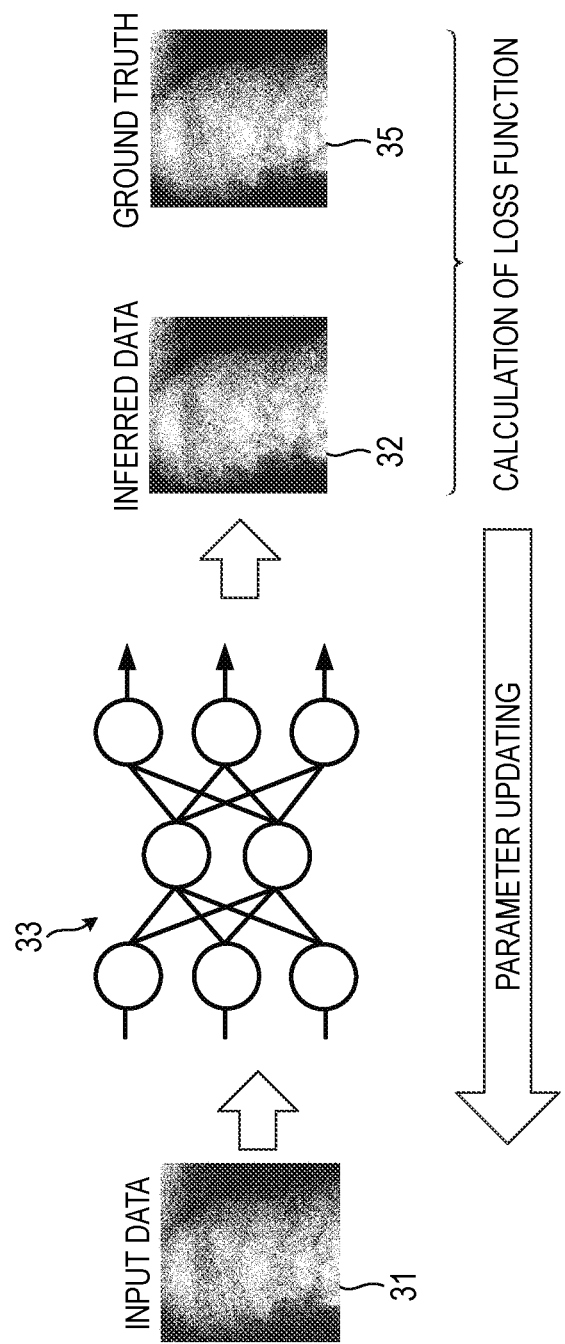

FIG. 5A
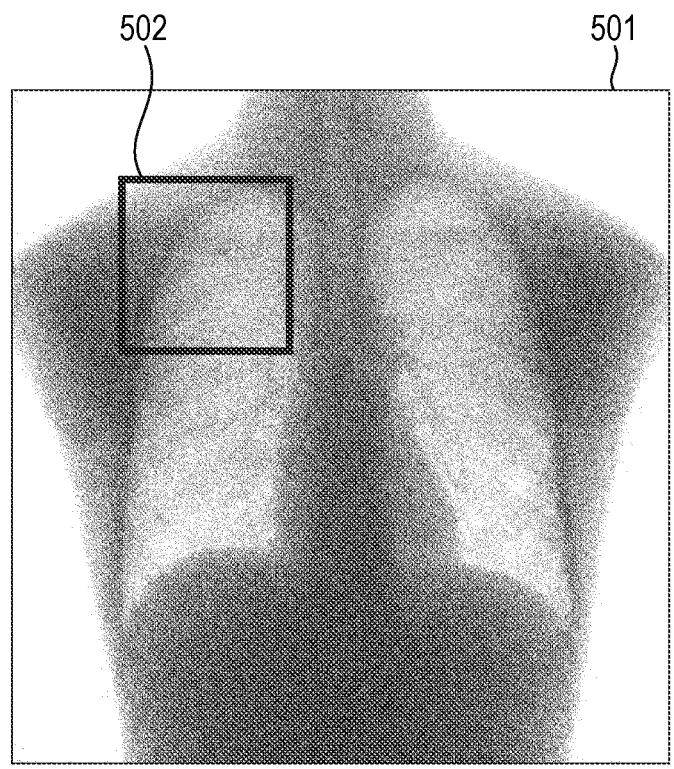
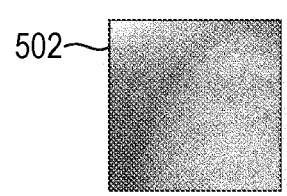

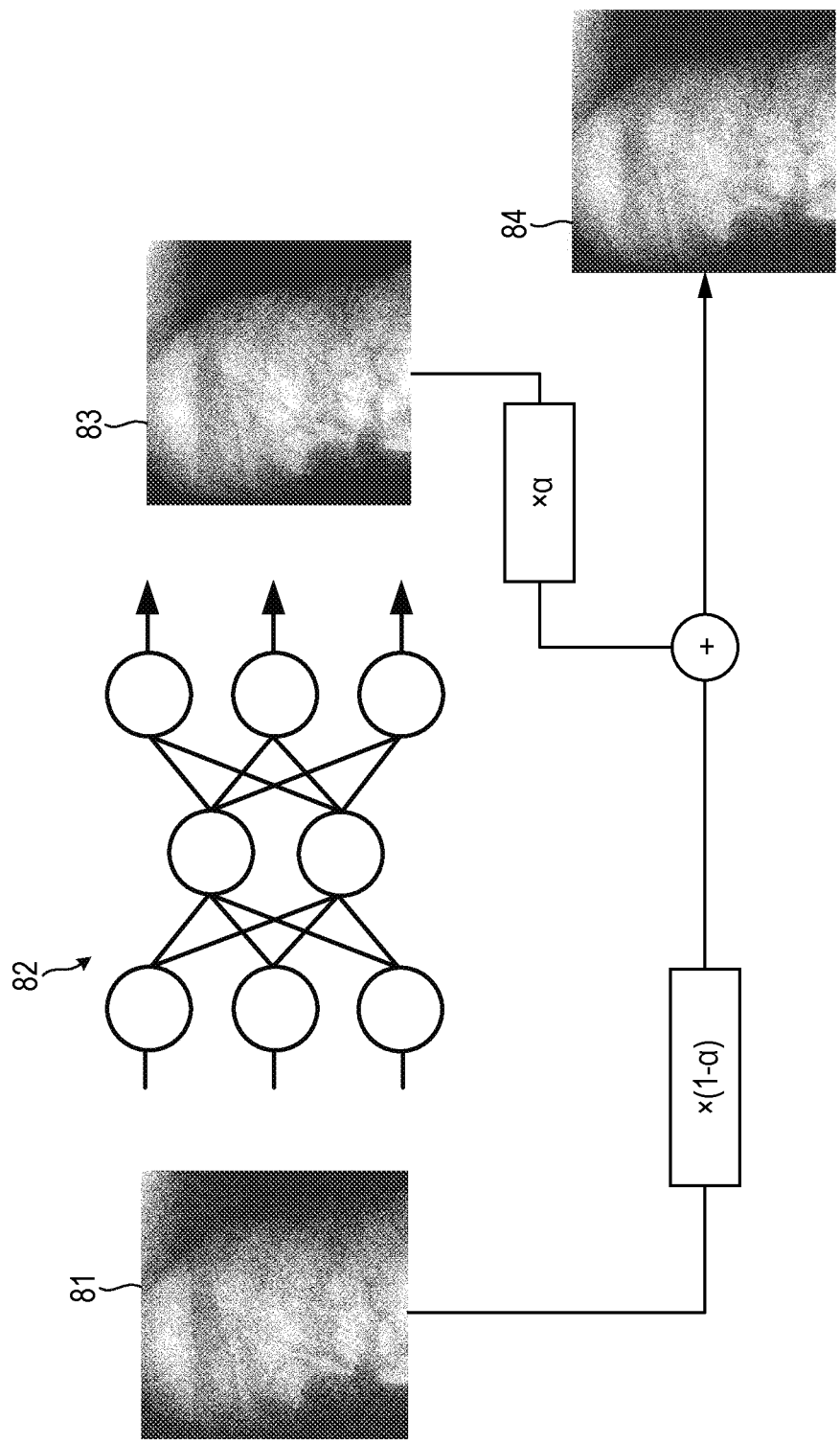

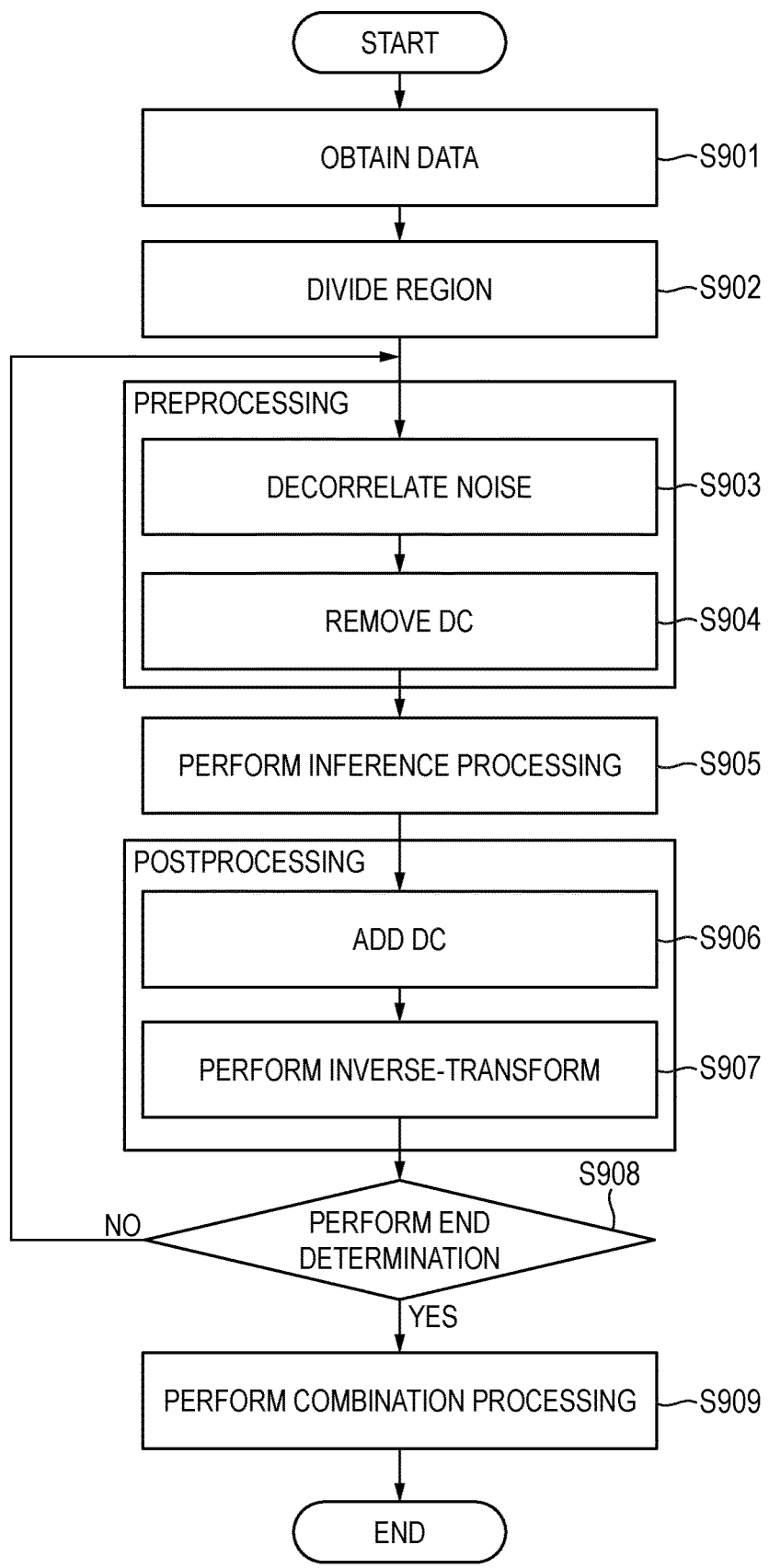

FIG. 10
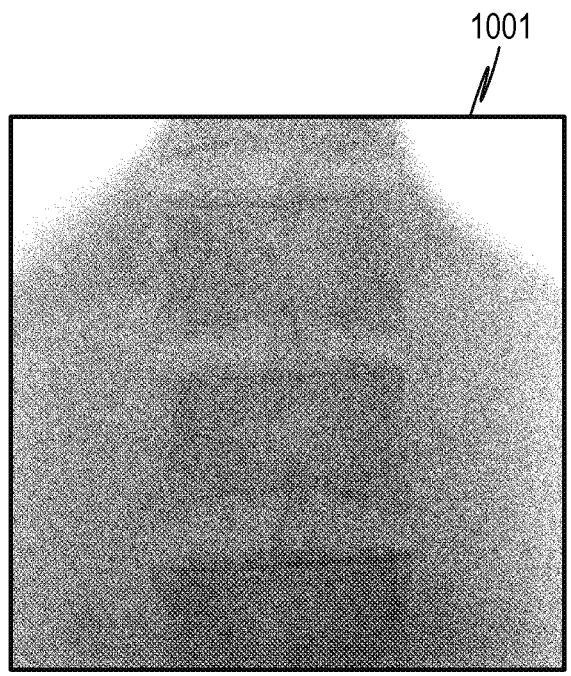
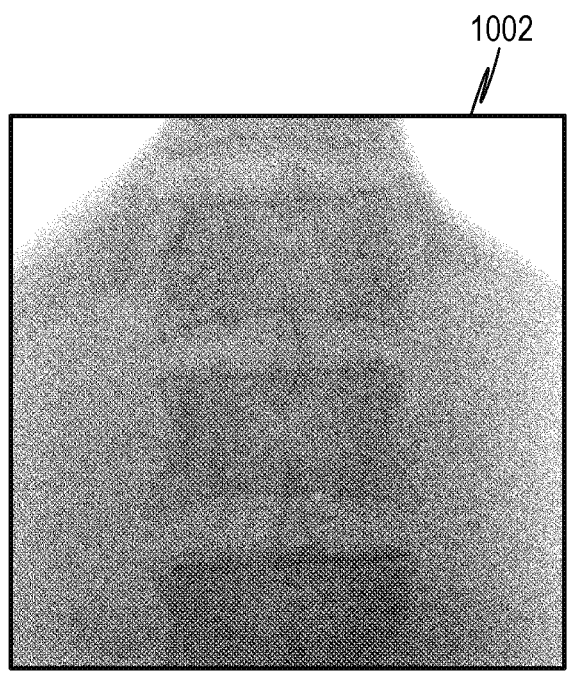

IMAGE PROCESSING APPARATUS, IMAGE PROCESSING METHOD, AND COMPUTER-READABLE MEDIUM

CROSS-REFERENCE TO RELATED APPLICATIONS

This application is a Continuation of International Patent Application No. PCT/JP2021/031218, filed Aug. 25, 2021, which claims the benefits of Japanese Patent Application No. 2020-143037, filed Aug. 26, 2020, and Japanese Patent Application No. 2021-123329, filed Jul. 28, 2021, all of which are hereby incorporated by reference herein in their entirety.

BACKGROUND OF THE INVENTION

Field of the Invention

The present disclosure relates to an image processing apparatus, an image processing method, a training apparatus, a training method and a computer-readable medium.

Description of the Related Art

In recent years, radiation detectors equipped with a detecting unit for detecting radiation such as X-rays are being widely used in fields such as industry and medical treatment. In particular, digital radiography (DR) apparatuses that obtain radiation images using semiconductor sensors have come into widespread use.

In such digital radiography apparatuses, it is common to perform various kinds of image processing to improve the image quality of a captured image, and one such kind of image processing is noise reduction processing that improves the graininess of a captured image and thereby improves the visibility of a region to be diagnosed.

Various methods have already been proposed as such kind of method for reducing noise. For example, Japanese Patent No. 4679710 discloses a rule-based noise reduction processing technique which creates rules based on the noise characteristics of a digital radiography apparatus, and switches the characteristics of a smoothing filter.

However, in the aforementioned prior art, the following problem may sometimes arise. In the rule-based noise reduction processing proposed in Japanese Patent No. 4679710, it is difficult to create appropriate rules in every case for various subject structures included in a captured image, and there have been instances where, depending on the subject, suitable noise reduction performance could not be obtained.

Here, in digital radiography apparatuses, when detecting radiation transmitted through a subject as an electric signal, it is common to adopt a configuration in which the radiation is converted into visible light by a scintillator such as CsI or GOS ($Gd_2O_2S$) and then detected by a semiconductor sensor. Because the converted visible light is diffused until reaching the semiconductor sensor by passing through the scintillator, noise that is attributable to fluctuations in the radiation quanta (hereinafter, referred to as "quantum noise") is smoothed, resulting in a state in which high frequencies are attenuated. On the other hand, noise generated from the detector and circuits and the like (hereinafter, referred to as "system noise") is not affected by the scintillator. Since the noise in a digital radiography apparatus is predominantly made up of the sum of system noise and quantum noise, such noise has a characteristic such that the content ratio with respect to these two kinds of noise changes depending on the signal that is input, and the frequency characteristics differ depending on the signal strength.

"Image Restoration Using Convolutional Auto-encoders with Symmetric Skip Connections", Xiao-Jiao Mao, Chunhua Shen, and Yu-Bin Yang, ArXiv: 1606.08921, 2016 proposes a technique which can realize noise reduction processing suitable for a greater amount of subjects by increasing the images used for training. However, when application of the technique in question to digital radiography apparatuses has been considered, because the aforementioned characteristic that the digital radiography apparatuses have noise had not been taken into account, training with respect to a neural network that realizes favorable noise reduction has been difficult in some cases.

SUMMARY OF THE INVENTION

An object of the present disclosure, which has been made in view of the above problem, is to provide an image processing apparatus, an image processing method, a training apparatus, a training method and a computer-readable medium storing a program that can perform favorable noise reduction processing in a digital radiography apparatus.

An image processing apparatus according to one embodiment of the present disclosure includes: an obtaining unit configured to obtain a first radiation image of an object to be examined; and a generating unit configured to, by inputting a first radiation image obtained by the obtaining unit into a learned model, generates a second radiation image in which noise is reduced compared to the first radiation image, wherein the learned model is obtained by training using training data including a radiation image obtained by adding noise with attenuated high-frequency components.

Further features of the present invention will become apparent from the following description of exemplary embodiments with reference to the attached drawings.

BRIEF DESCRIPTION OF THE DRAWINGS

FIG. 3C is a view for describing an operative example of training processing according to Embodiment 1.

FIG. 5A is a view for describing region dividing processing according to Embodiment 1.

FIG. 8 is a schematic diagram illustrating an example of adjustment of noise reduction processing strength in inference processing according to Embodiment 1.

FIG. 9 is a flowchart of inference processing according to Embodiment 1.

FIG. 10 is a view illustrating an example of an image before and after image processing according to Embodiment 1.

DESCRIPTION OF THE EMBODIMENTS

Figure 1A:
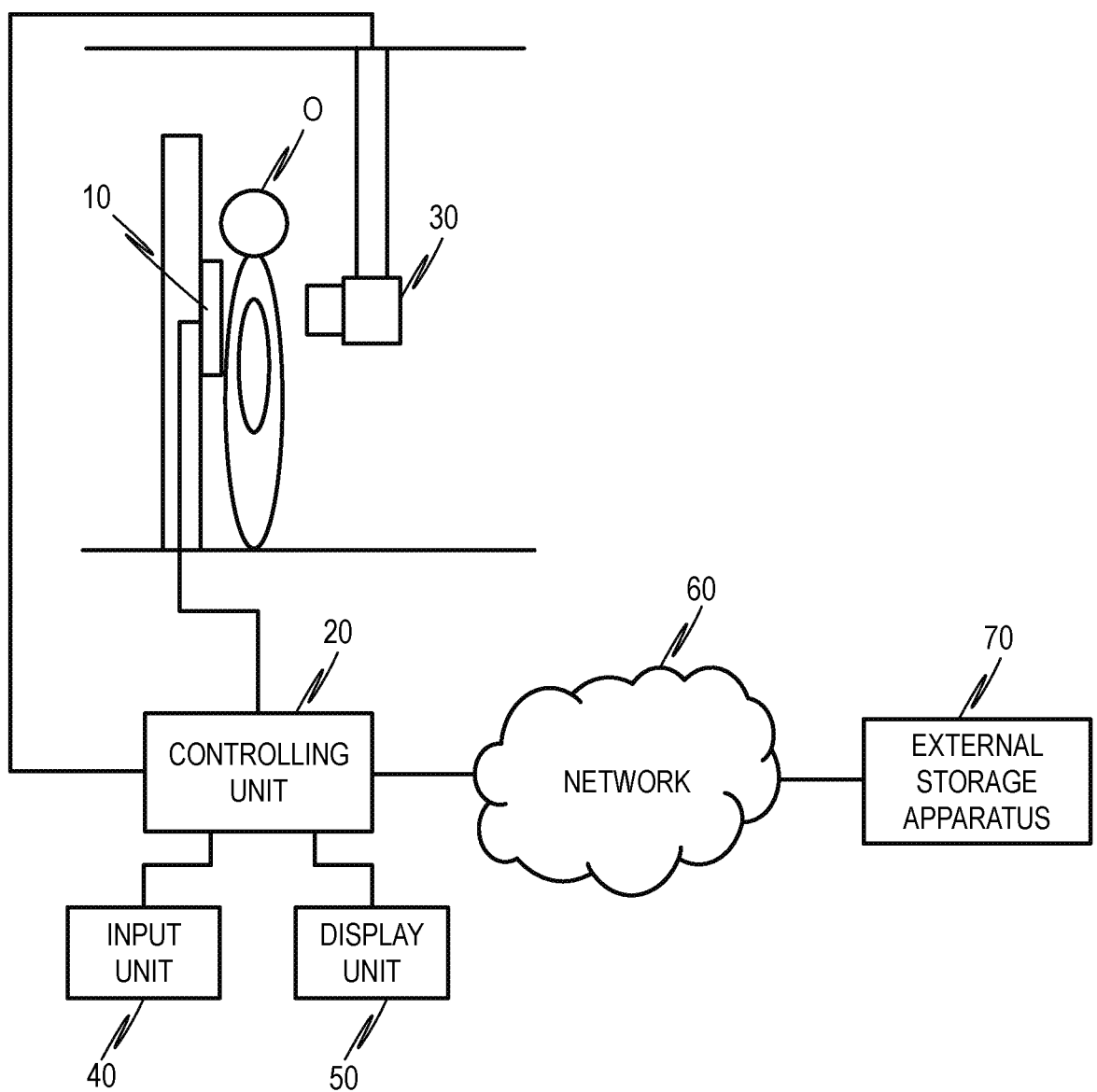
FIG. 1A is a view illustrating a schematic configuration of a radiation imaging system according to Embodiment 1.

Hereinafter, exemplary examples for performing the present invention will be described in detail with reference to the drawings. However, the dimensions, materials, shapes and relative positions of the components described in the following embodiments are not determinate, and can be changed according to a configuration of an apparatus to which the present invention is applied or to various conditions. Further, identical or functionally similar elements are denoted by the same reference numerals in different drawings.

Note that, in the embodiments of the present disclosure described hereunder, the term "radiation" includes a-rays, (3-rays, and y-rays that are beams generated by particles (including photons) emitted by radioactive decay, and also beams having a similar or higher level of energy to these beams, for example, X-rays, particle rays, and cosmic rays. Further, hereunder, dark current noise, electrical noise or the like that does not depend on the magnitude of a signal of a radiation image is referred to as "system noise".

Further, the term "machine learning model" refers to a learning model that learned according to a machine learning algorithm. Specific examples of algorithms for machine learning include the nearest-neighbor method, the naive Bayes method, the decision tree, and the support vector machine. Further, a neural network or deep structured learning (deep learning) may be used. Algorithms that can be utilized among the aforementioned algorithms can be appropriately used and applied to the embodiments and modifications that are described hereunder. Further, the term "training data" refers to a data set that is used for training of a machine learning model, and is constituted by pairs of input data which is input into the machine learning model and ground truth which is a correct answer of an output result of the machine learning model.

Note that, the term "learned model" refers to a model which has performed training, with respect to a machine learning model that is in accordance with any machine learning algorithm, such as deep learning, using appropriate training data in advance. However, although the learned model is a model obtained using appropriate training data in advance, the learned model is not a model that does not perform further learning, and is a model that can also perform incremental learning. Incremental learning can also be performed after the apparatus is installed at the usage destination.

Embodiment 1

(Configuration of Radiation System)

Hereunder, a radiation imaging system according to Embodiment 1 of the present disclosure is described referring to FIG. 1A to FIG. 10. FIG. 1A is a view illustrating the schematic configuration of a radiation imaging system 1 according to the present embodiment. Note that, although an object to be examined O is described as a human body in the following description, an object to be examined O imaged by a radiation imaging system according to the present disclosure is not limited to a human body, and may be another animal or a plant, or an object of nondestructive examination or the like.

A radiation detector 10, a controlling unit 20, a radiation generator 30, an input unit 40, and a display unit 50 are provided in the radiation imaging system 1 according to the present embodiment. Note that, the radiation imaging system 1 may include an external storage apparatus 70 such as a server that is connected to the controlling unit 20 through a network 60 such as the Internet or an intranet.

The radiation generator 30 includes, for example, a radiation generating source such as an X-ray tube, and can emit radiation. The radiation detector 10 can detect radiation emitted by the radiation generator 30, and can generate a radiation image corresponding to the detected radiation. Therefore, by detecting radiation which has been emitted by the radiation generator 30 and which has passed through the object to be examined O, the radiation detector 10 can generate a radiation image of the object to be examined O.

Figure 1B:
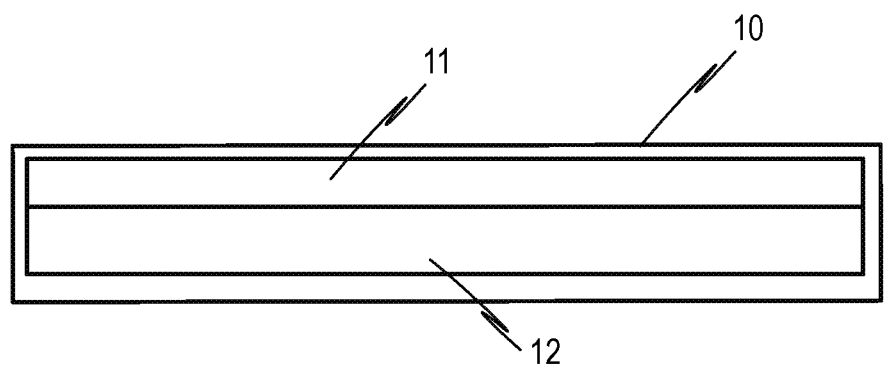
FIG. 1B is a view illustrating a schematic configuration of a radiation detector according to Embodiment 1.

Here, FIG. 1B is a view illustrating the schematic configuration of the radiation detector 10 according to the present embodiment. A scintillator 11 and an imaging sensor 12 are provided in the radiation detector 10. The scintillator 11 converts radiation incident on the radiation detector 10 into light having a wavelength that can be detected by the imaging sensor 12. The scintillator 11 may include, for example, CsI or GOS ($Gd_2O_2S$). The imaging sensor 12 includes, for example, a photoelectric conversion element made of a-Si or crystalline Si, and can detect light corresponding to the radiation that has been converted by the scintillator 11, and output a signal corresponding to the detected light. The radiation detector 10 can generate a radiation image by performing A/D conversion or the like on a signal which has been output by the imaging sensor 12. Note that, although omitted from the schematic configuration in FIG. 1B, the radiation detector 10 may include a calculating unit and an A/D converting unit.

The controlling unit 20 is connected to the radiation detector 10, the radiation generator 30, the input unit 40 and the display unit 50. The controlling unit 20 can obtain a radiation image output from the radiation detector 10 and perform image processing on the radiation image, and can control driving of the radiation detector 10 and the radiation generator 30. Thus, the controlling unit 20 can function as one example of an image processing apparatus. Further, the controlling unit 20 may be connected to the external storage apparatus 70 through the arbitrary network 60 such as the Internet or an intranet, and may obtain a radiation image or the like from the external storage apparatus 70. In addition, the controlling unit 20 may be connected to another radiation detector or radiation generator or the like through the network 60. Note that, the controlling unit 20 may be connected by wire or wirelessly to the external storage apparatus 70 or the like.

The input unit 40 includes an input device such as a mouse, a keyboard, a trackball, or a touch panel, and can be operated by an operator to input an instruction to the controlling unit 20. The display unit 50, for example, includes an arbitrary monitor, and can display information or an image output from the controlling unit 20, and information or the like input by the input unit 40.

Note that, although in the present embodiment the controlling unit 20, the input unit 40, the display unit 50 and the like are each constituted by separate apparatuses, two or more of these units may be integrated in a single apparatus. For example, the input unit 40 and the display unit 50 may be constituted by a touch panel display. Further, although the image processing apparatus is constituted by the controlling unit 20 in the present embodiment, it suffices that the image processing apparatus can obtain a radiation image and perform image processing on the radiation image, and the image processing apparatus need not control driving of the radiation detector 10 and the radiation generator 30.

The controlling unit 20 may be connected by wire or wirelessly to the radiation detector 10 and the radiation generator 30 and the like. In addition, the external storage apparatus 70 may be constituted by an image system such as a PACS system in a hospital, or may be a server or the like that is outside a hospital.

(Configuration of Controlling Unit)

Figure 2A:
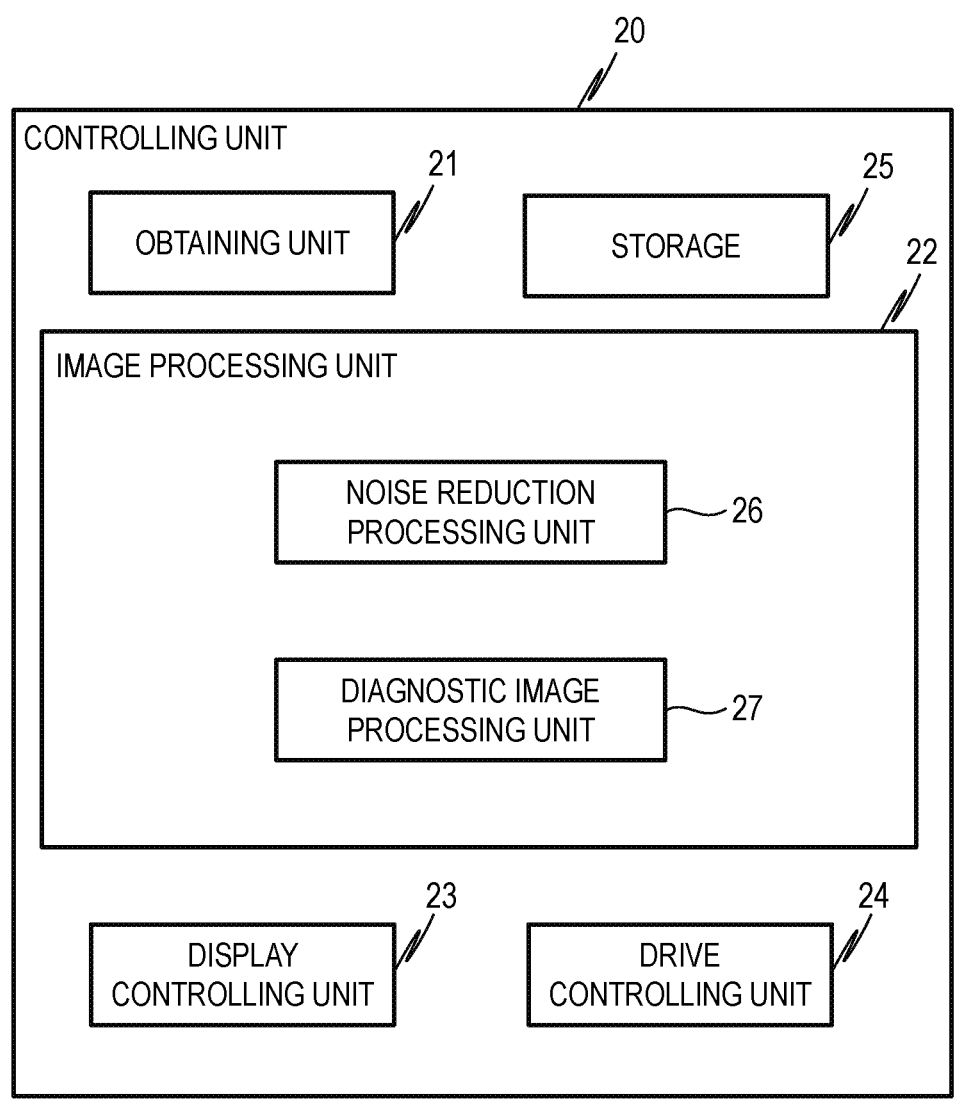
FIG. 2A is a view illustrating a schematic configuration of a controlling unit according to Embodiment 1.
Figure 2B:
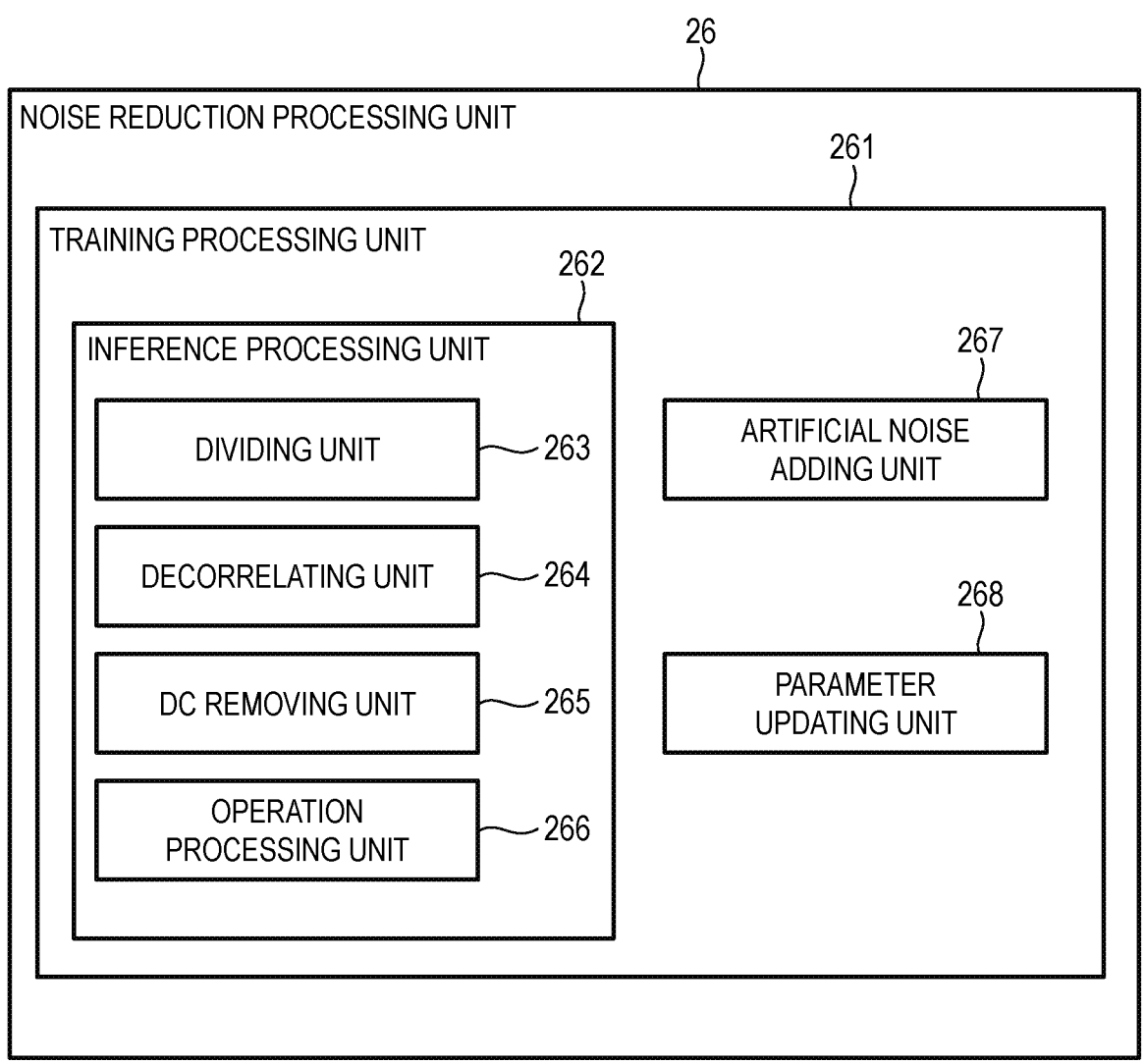
FIG. 2B is a view illustrating a schematic configuration of a noise reduction processing unit according to Embodiment 1.

Next, a more specific configuration of the controlling unit 20 is described referring to FIG. 2A and FIG. 2B. FIG. 2A is a view illustrating the schematic configuration of the controlling unit 20 according to the present embodiment. FIG. 2B is a view illustrating the schematic configuration of a noise reduction processing unit 26 included in the controlling unit 20. As illustrated in FIG. 2A, an obtaining unit 21, an image processing unit 22, a display controlling unit 23, a drive controlling unit 24, and a storage 25 are provided in the controlling unit 20.

The obtaining unit 21 can obtain a radiation image output by the radiation detector 10, and various kinds of information and the like input by the input unit 40. Further, the obtaining unit 21 can obtain a radiation image and patient information or the like from the external storage apparatus 70 or the like.

The noise reduction processing unit 26 and a diagnostic image processing unit 27 are provided in the image processing unit 22. The image processing unit 22 can perform image processing according to the present disclosure on a radiation image obtained by the obtaining unit 21. As illustrated in FIG. 2B, a training processing unit 261 and an inference processing unit 262 are provided in the noise reduction processing unit 26. A dividing unit 263, a decorrelating unit 264, a DC removing unit 265, and an operation processing unit 266 are provided in the inference processing unit 262. In addition to the configuration of the inference processing unit 262, an artificial noise adding unit 267 and a parameter updating unit 268 are also provided in the training processing unit 261. According to this configuration, the noise reduction processing unit 26 can perform training of a machine learning model for performing noise reduction processing, and can use the machine learning model to apply favorable noise reduction processing to a radiation image.

Further, the diagnostic image processing unit 27 can perform diagnostic image processing for transforming an image that has been subjected to noise reduction by the noise reduction processing unit 26 into an image that is suitable for diagnosis. The diagnostic image processing includes, for example, gradation processing, enhancement processing, and grid stripe reduction processing.

Next, the configuration of the inference processing unit 262 is described. The inference processing unit 262 can perform inference processing that applies a learned model to an arbitrary radiation image that is input, and outputs the obtained result.

The dividing unit 263 can divide a radiation image into images of a plurality of regions. The dividing unit 263 can also combine images of a plurality of regions to generate a single image.

The decorrelating unit 264 performs processing that, with respect to the magnitude of quantum noise caused by fluctuations in radiation included in a radiation image, eliminates the correlation (decorrelates) with the magnitude of a signal corresponding to the detected radiation. Here, it is known that the variance of quantum noise (hereunder, referred to as "magnitude of noise") is proportional to the radiation dose. Therefore, the magnitude of quantum noise is proportional to the signal amount pertaining to each pixel (hereinafter, referred to as "pixel value") in the radiation image corresponding to the detected radiation dose. By performing decorrelating processing on a radiation image, the decorrelating unit 264 according to the present embodiment can make the magnitude of quantum noise approximately constant regardless of the sizes of the pixel values of the respective pixels in the radiation image. The specific procedure of the decorrelating processing will be described later.

Further, by performing inverse-transform processing of the transform processing pertaining to the decorrelating processing on a radiation image that has been subjected to the decorrelating processing, the decorrelating unit 264 can restore the correlation between the magnitude of quantum noise and pixel values to the original correlation. Note that, separate components that perform decorrelating processing of noise and inverse-transform of the decorrelating processing, respectively, may be provided, and in this case a functional block including the respective components can be provided as the decorrelating unit 264.

The direct current (DC) removing unit 265 performs processing that subtracts a direct-current component of an image and equalizes the average signal level of the image. Specifically, the DC removing unit 265 removes the direct-current component of a radiation image by subtracting an average pixel value of the radiation image from each pixel value of the image so that the average pixel value of the radiation image becomes zero (0). Further, by subjecting an image on which DC removing processing has been performed to processing that adds the subtracted average pixel value to the respective pixel values, the DC removing unit 265 can restore the average signal level of the radiation image to the average signal level before transform. Note that, separate components that perform DC removing processing and DC adding processing, respectively, may be provided, and in this case a functional block including the respective components can be provided as the DC removing unit 265. Further, removal of a direct-current component may be performed on each image obtained when a radiation image is divided by the dividing unit 263, or may be performed on the entire radiation image before being divided by the dividing unit 263.

An image which has been subjected to processing by the dividing unit 263, the decorrelating unit 264, and the DC removing unit 265 is input to the operation processing unit 266, and the operation processing unit 266 can perform processing on the image using a learned model, to be described later, and thereby generate an image in which noise that has been included in the input image has been reduced. Note that, the noise that is reduced in the present embodiment includes system noise such as dark current or electrical noise generated by the imaging sensor 12 and quantum noise caused by fluctuations in radiation.

Next, the configuration of the training processing unit 261 is described. The training processing unit 261 performs training processing that is applied when training a machine learning model. In addition to the configuration of the inference processing unit 262, the training processing unit 261 also includes the artificial noise adding unit 267 and the parameter updating unit 268.

Training data is required when performing training processing. Processing by the dividing unit 263, the decorrelating unit 264 and the DC removing unit 265 is applied to both the input data and ground-truth of the training data.

Here, the artificial noise adding unit 267 performs processing that adds artificial noise created by simulating the characteristics of a radiation image to the training data. The addition of artificial noise is performed with respect to only the input data of the training data, or with respect to the input data and the ground-truth of the training data. Note that, in the case of adding artificial noise to the input data and the ground-truth, for example, the artificial noise adding unit 267 adds noise to the input data and the ground-truth in a manner so that the quantity of noise added to the input data is greater than the quantity of noise added to the ground-truth. However, a method for adding artificial noise to input data and ground-truth is not limited to the method described above, and it suffices that artificial noise is added in a manner so that a difference arises between the input data and the ground-truth. Further, the timing at which artificial noise is added may be an arbitrary timing between respective processing operations performed in the inference processing unit 262, for example, the addition of artificial noise can be performed at an arbitrary timing such as by adding artificial noise to a radiation image to be input to the inference processing unit 262, or by adding artificial noise after decorrelating processing.

After the image to which artificial noise has been added is subjected to the appropriate processing, the image is input to the operation processing unit 266. Note that, details of the artificial noise that is added are described later.

The parameter updating unit 268 performs processing that updates parameters of a machine learning model which the operation processing unit 266 possesses, based on the result of operations by the operation processing unit 266 and the ground-truth. The details of the operations of the parameter updating unit 268 are described later.

The training processing unit 261 need not necessarily be included in the radiation imaging system 1. For example, a configuration may be adopted in which the training processing unit 261 is configured on hardware that is separate from the radiation imaging system, and performs training in advance using appropriate training data to create a learned model, and only processing by the inference processing unit 262 is performed in the radiation imaging system. Alternatively, a configuration may be adopted in which, by including the training processing unit 261 in the radiation imaging system 1, incremental learning can be performed using training data obtained after installation.

The display controlling unit 23 can control the display of the display unit 50, and can cause the display unit 50 to display radiation images before and after image processing by the image processing unit 22, and patient information and the like. The drive controlling unit 24 can control driving of the radiation detector 10 and the radiation generator 30 and the like. Therefore, by controlling the driving of the radiation detector 10 and the radiation generator 30 by means of the drive controlling unit 24, the controlling unit 20 can control imaging of a radiation image.

The storage 25 can store an operating system (OS), device drivers of peripheral devices, and programs for implementing various kinds of application software including programs for performing processing and the like to be described later. The storage 25 can also store information obtained by the obtaining unit 21, and radiation images that have been subjected to image processing by the image processing unit 22 and the like. For example, the storage 25 can store radiation images obtained by the obtaining unit 21, and can store radiation images that have been subjected to noise reduction processing to be described later.

Note that, the controlling unit 20 can be constituted using a common computer including a processor and a memory, and may also be configured as a dedicated computer of the radiation imaging system 1. Although here the controlling unit 20 functions as one example of an image processing apparatus according to the present embodiment, the image processing apparatus according to the present embodiment may be a computer that is a separate apparatus (external computer) which is communicably connected to the controlling unit 20. Further, the controlling unit 20 or image processing apparatus may be, for example, a personal computer, and a desktop PC, a notebook PC, or a tablet PC (portable information terminal) may be used.

Note that, the processor may be a CPU (central processing unit). Further, the processor may be, for example, an MPU (Micro Processing Unit), a GPU (Graphical Processing Unit) or an FPGA (Field-Programmable Gate Array).

The respective functions of the controlling unit 20 may be implemented by a processor such as a CPU or an MPU executing a software module stored in the storage 25. Further, the respective functions may be realized by a circuit that serves a specific function such as an ASIC, or the like. For example, the image processing unit 22 may be realized by dedicated hardware such as an ASIC, and the display controlling unit 23 may be realized using a dedicated processor such as a GPU that is different to the CPU. The storage 25, for example, may be constituted by any storage medium such an optical disk such as a hard disk or a memory.

(Configuration of Machine Learning Model)

Figure 3A:
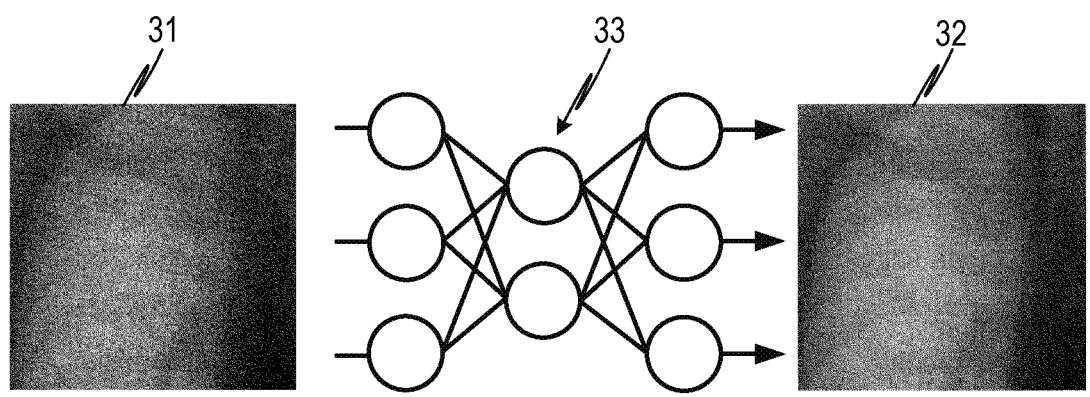
FIG. 3A is a view illustrating an example of the schematic configuration of a learned model according to Embodiment 1.
Figure 3B:
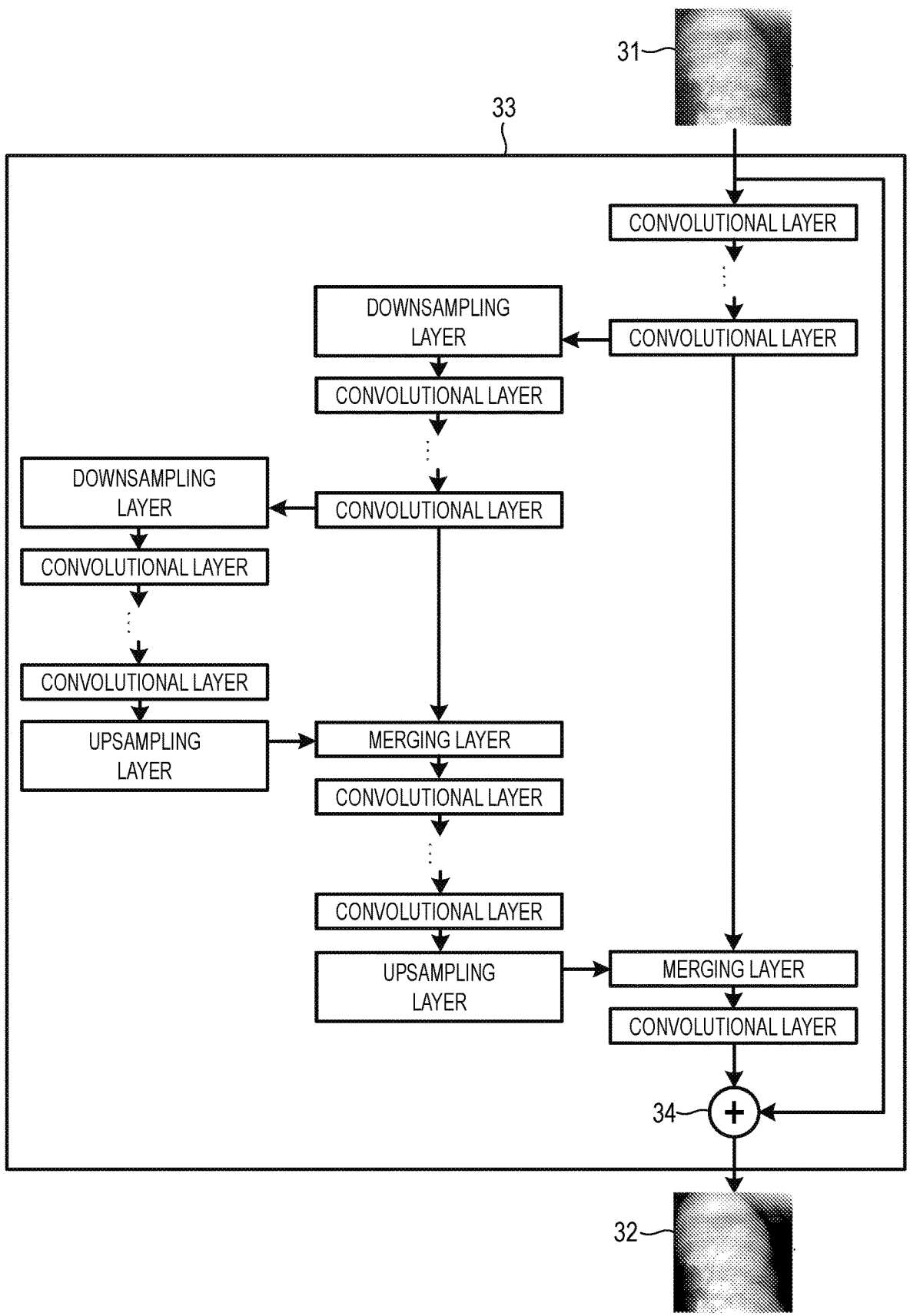
FIG. 3B is a view illustrating an example of the schematic configuration of a learned model according to Embodiment 1.

Next, an example of a machine learning model constituting a learned model according to the present embodiment is described referring to FIG. 3A to FIG. 3C. One example of a machine learning model which the operation processing unit 266 according to the present embodiment uses is a multilayer neural network.

FIG. 3A is a view illustrating an example of the schematic configuration of a neural network model according to the present embodiment. A neural network model 33 illustrated in FIG. 3A is designed so that, with respect to input data 31, the neural network model 33 outputs inferred data 32 in which noise has been reduced according to a tendency that has been learned in advance. A radiation image in which noise has been reduced that is output is an image which is based on the training content in a machine learning process, and the neural network according to the present embodiment learns feature amount for distinguishing between a signal and noise that are included in a radiation image.

Note that, for example, a convolutional neural network (hereinafter referred to as "CNN") can be used for at least one part of the multilayer neural network. Further, technology relating to an auto-encoder may be used for at least one part of the multilayer neural network.

Here, a case in which a CNN is used as a machine learning model for noise reduction processing of a radiation image is described. FIG. 3B is a view illustrating an example of the schematic configuration of a CNN constituting the neural network model 33 according to the present embodiment. In the example of a learned model according to the present embodiment, when a radiation image is input as the input data 31, the inferred data 32 in which noise has been reduced can be output.

The CNN illustrated in FIG. 3B includes a plurality of layers that are responsible for the processing of processing and outputting input values. Note that, as the kinds of the layers included in the configuration of the CNN, there are a convolutional (Convolution) layer, a downsampling layer, an upsampling layer, and a merging (Merger) layer.

The convolutional layer is a layer that performs the convolutional processing on input values according to parameters, such as the kernel size of a set filter, the number of filters, the value of a stride, and the value of dilation. Note that the number of dimensions of the kernel size of a filter may also be changed according to the number of dimensions of an input image.

The downsampling layer is a layer that performs the processing of making the number of output values less than the number of input values by thinning or combining the input values. Specifically, for example, there is Max Pooling processing as such processing.

The upsampling layer is a layer that performs the processing of making the number of output values more than the number of input values by duplicating the input values or adding a value interpolated from the input values. Specifically, for example, there is upsampling processing by deconvolustion as such processing.

The merging layer is a layer to which values, such as the output values of a certain layer and the pixel values constituting an image, are input from a plurality of sources, and that combines them by concatenating or adding them.

Further, the neural network may have an adding layer 34 that adds the input data to the data output from the convolutional layer in the first layer in the decoder side. In this case, a shortcut that adds the input data may be configured before the output. According the configuration, the CNN can employ a configuration for learning the difference between the input data and the ground-truth, and deal with a system that suitably processes noise as the target.

Note that caution is required, since when the setting of the parameters to the layers and nodes constituting a neural network is different, the degree with respect to tendency trained from the training data, that can be reproduced at the inference may be different. In other words, in many cases, since appropriate parameters are different depending on the mode at the time of implementation, the parameters can be changed to preferable values according to the needs.

Additionally, the CNN may obtain better characteristics not only by changing the parameters as described above, but also by changing the configuration of the CNN. The better characteristics are, for example, a high accuracy of the noise reduction on a radiation image which is output, a short time for processing, and a short time taken for training of a machine learning model.

Note that the configuration of the CNN used in the present embodiment is a U-net type machine learning model that includes the function of an encoder including a plurality of hierarchies including a plurality of downsampling layers, and the function of a decoder including a plurality of hierarchies including a plurality of upsampling layers. In other words, the configuration of the CNN includes a U-shaped configuration that has an encoder function and a decoder function. The U-net type machine learning model is configured (for example, by using a skip connection) such that the geometry information (space information) that is made ambiguous in the plurality of hierarchies configured as the encoder can be used in a hierarchy of the same dimension (mutually corresponding hierarchy) in the plurality of hierarchies configured as the decoder.

Although not illustrated, as an example of change of the configuration of the CNN, for example, a layer of an activation function (for example, Rectifier Linear Unit (ReLu)) may be incorporated before or after the convolutional layer, and a layer that performs various normalization processing, such as a batch normalization, may be further incorporated before or after such a layer.

Features of noise can be extracted from an input radiation image through these steps of the CNN.

Here, the training processing unit 261 includes the parameter updating unit 268. As illustrated in FIG. 3C, the parameter updating unit 268 performs processing that calculates a loss function based on the inferred data 32 obtained by applying the neural network model 33 of the operation processing unit 266 to the input data 31 in the training data, and ground-truth 35 in the training data. In addition, the parameter updating unit 268 performs processing that updates the parameters of the neural network model 33 based on the calculated loss function. Here, the loss function is a function that shows an error between the inferred data 32 and the ground-truth 35.

More specifically, the parameter updating unit 268 updates a filter coefficient and the like of the convolutional layer using, for example, an error back-propagation method so that an error between the inferred data 32 and the ground-truth 35 which is represented by the loss function decreases. The error back-propagation method is a method that adjusts parameters and the like between each node of the neural network so that the aforementioned error decreases. Note that, a technique (dropout) that randomly deactivates units (respective neurons or respective nodes) constituting the CNN may be used for training.

In addition, a learned model which the operation processing unit 266 uses may be a learned model generated using transfer learning. In this case, for example, a learned model that is used for noise reduction processing may be generated by performing transfer learning with respect to a machine learning model that learned using a radiation image of an object to be examined O of a different kind or the like. By performing such kind of transfer learning, a learned model can also be efficiently generated with respect to an object to be examined O for which it is difficult to obtain a large amount of training data. The object to be examined O of a different kind or the like mentioned here may be, for example, an animal, a plant, or an object of nondestructive examination.

Here, a GPU can perform efficient arithmetic operations by performing parallel processing of larger amounts of data. Therefore, in the case of performing training a plurality of times using a learning model that utilizes a CNN as described above, it is effective to perform processing with a GPU. Thus, in the training processing unit 261 according to the present embodiment, a GPU is used in addition to a CPU. Specifically, when a training program including the learning model is executed, training is performed by the CPU and the GPU cooperating to perform arithmetic operations. Note that, in the training processing, arithmetic operations may be performed by only the CPU or the GPU. Further, the respective processing performed by the inference processing unit 262 may be realized using a GPU, similarly to the training processing unit 261.

Whilst the configuration of a machine learning model has been described above, the present disclosure is not limited to a model that uses a CNN that is described above. It suffices that the learning performed by the machine learning model is learning that is similar to machine learning that uses a model capable of, by itself, extracting (representing) feature amount of training data such as an image by learning.

(Training Processing)

Next, the flow of processing of the training processing unit 261 according to the present embodiment is described. Here, as the training data used by the training processing unit 261, ideally it is desirable to use a pair including a radiation image that includes noise as the input data, and a radiation image that substantially does not include noise as the ground-truth. In order to obtain a radiation image that substantially does not include noise, for example, a method may be mentioned that cancels out a noise component which has no correlation with the signal by performing imaging of the same object to be examined a plurality of times to create an average image or the like. However, particularly in the medical field, when taking into consideration the invasiveness of radiography, it is not realistic to perform the aforementioned means using an actual human body, and it is difficult to prepare a pair including a radiation image that includes noise and a radiation image that substantially does not include noise as training data.

For this reason, in the present embodiment, a radiation image obtained by imaging a human body for medical purposes is used as ground-truth of the training data, and an image obtained by adding artificial noise corresponding to noise that occurs in a radiation image to the aforementioned radiation image is used as input data of the training data. By training using such training data, image features of a radiation image and characteristics of artificial noise can be learned. Note that, the noise that is added is not limited to artificial noise. For example, in a case where imaging of the same object to be examined can be performed a plurality of times, differential processing may be performed using a radiation image obtained by imaging the object to be examined and an average image obtained by imaging the same object to be examined a plurality of times, to thereby obtain a noise component to be added to a radiation image.

The present inventor discovered that when artificial noise is added in a form simulating the characteristics of noise of an actual radiation image by a mode such as will be described later, a machine learning model can be generated that can output a radiation image in which noise is suitably reduced even when an actual radiation image is input.

Taking into consideration the circumstances described above, the flow of processing of the training processing unit 261 according to the present embodiment will be described referring to FIG. 3D to FIG. 7B and FIG. 12. FIG. 4 is a flowchart illustrating the flow of processing of the training processing unit 261 according to the present embodiment. In the method for generating training data according to the present embodiment, processing for adding artificial noise is performed before preprocessing that includes noise decorrelating processing and DC removing processing.

In step S401, training data is input to the training processing unit 261. Obtainment of the training data that is input is performed by the obtaining unit 21, and in the present embodiment an appropriate radiation image is obtained as the training data. Note that, the obtaining unit 21 may obtain a radiation image stored in the storage 25, or may obtain a radiation image from the external storage apparatus 70 or the like. Further, the obtaining unit 21 may obtain a radiation image that has been output by the radiation detector 10. Note that, the training data in the present embodiment is training data in which the aforementioned radiation image is used as input data and as ground-truth. After the training data is input as the same data to the training processing unit 261, appropriate artificial noise is added to the input data or to the input data and the ground-truth inside the training processing unit so that a state is entered in which there is a difference between the input data and the ground-truth.

Figure 5B:
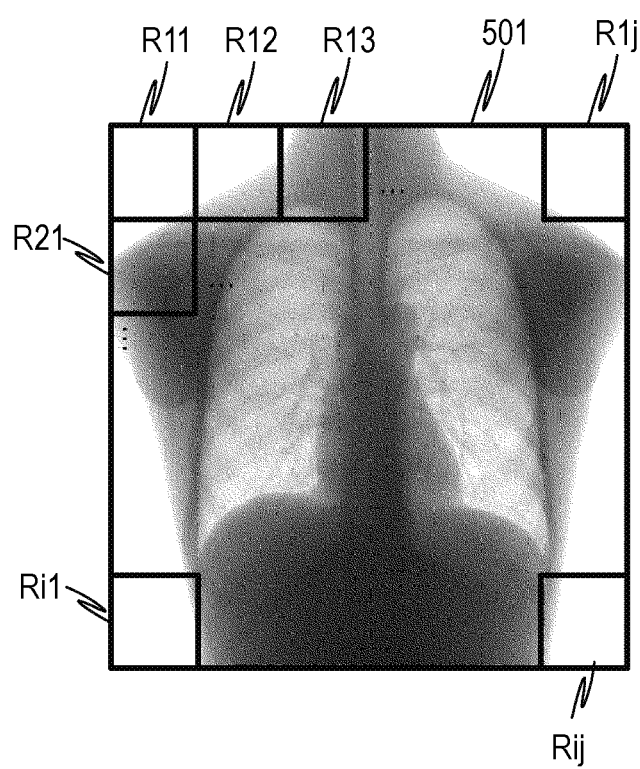
FIG. 5B is a view for describing region dividing processing according to Embodiment 1.
Figure 5C:
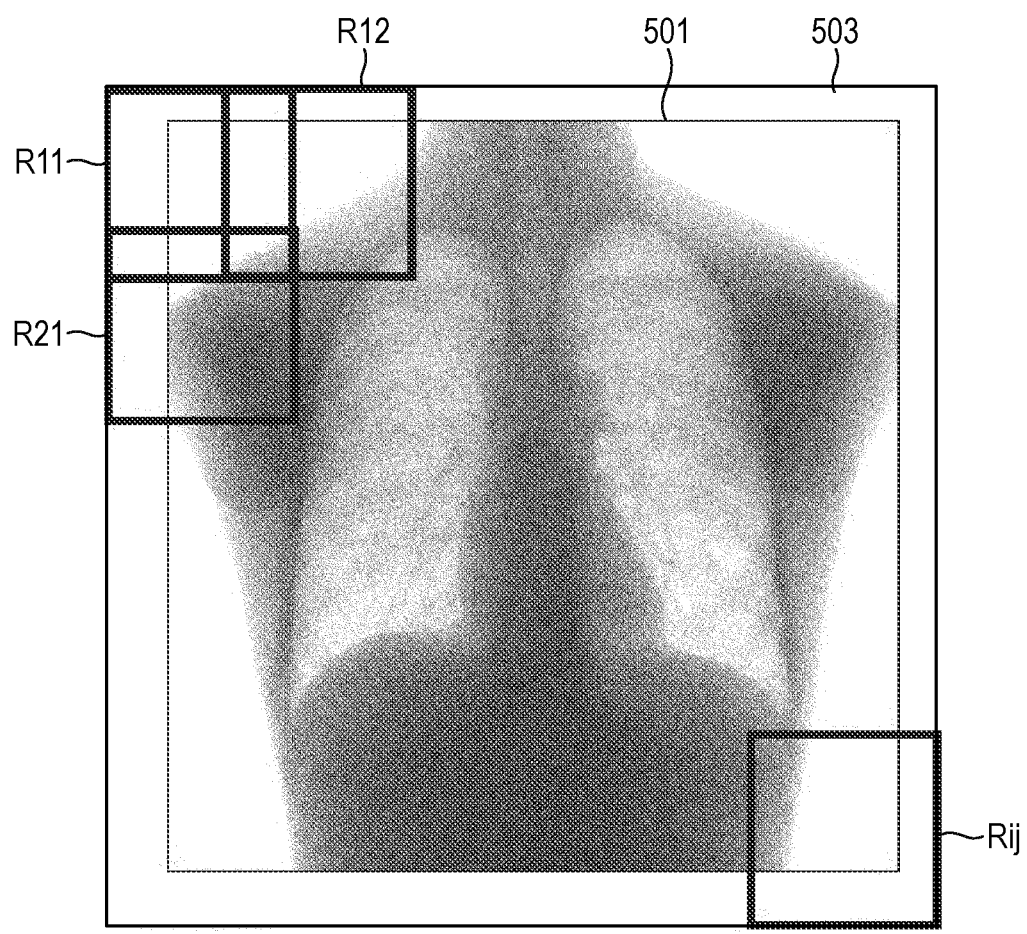
FIG. 5C is a view for describing region dividing processing according to Embodiment 1.

In step S402, the dividing unit 263 performs region dividing processing on the radiation image that has been input. FIG. 5A to FIG. 5C are images for describing the region dividing processing according to the present embodiment. In the example illustrated in FIG. 5A, the dividing unit 263 subjects a radiation image 501 to region dividing to create an appropriate divided image 502. Note that, the training data that is input to the training processing unit 261 is made up of input data and ground-truth, and the dividing unit 263 operates so as to divide a region of both images at the same position.

Here, the number of pixels of the divided image 502 may be set to any number as long as the number is not greater than a number of pixels within a range in which processing can be performed completely at one time in an arithmetic unit which the operation processing unit 266 operates, and which is a number that is large enough to enable extraction of feature amount relating to noise within the image. Note that, in the case of a radiation image for medical use, the radiation detector 10 is often a high definition detector, and in some cases the radiation image 501 may have a number of pixels that is more than, for example, 2688 pix×2688 pix, and the number of pixels exceeds the number of pixels which the arithmetic unit that the operation processing unit 266 operates is capable of performing an arithmetic operation on. For example, the number of pixels of the divided image 502 can be set to about 256 pix×256 pix.

Note that, in the operations of the training processing unit 261, the processing from step S401 to step S407 is repeated, and in the region dividing processing in step S402 the range of the region image may be set so as to include a portion that overlaps with a region image created during the loop. In this case, a greater amount of training data can be generated from a single radiation image. Further, various kinds of data expansion may be performed. Examples of such data expansion that may be mentioned include rotation, reduction, enlargement, skewing, changing of the signal amount, and addition of offset. Further, expansion of the training data may be performed using generative adversarial networks (GAN).

In step S403, artificial noise is added to the divided image 502 by the artificial noise adding unit 267. As described above, noise that is near to noise that is actually generated in a radiation image can be adopted as the artificial noise. Hereunder, an example of artificial noise that is added in the present embodiment is described.

As described in the foregoing, noise included in a radiation image is broadly divided into mainly quantum noise generated by fluctuations of radiation quanta, and system noise generated from a detector and circuits or the like.

Figure 12:
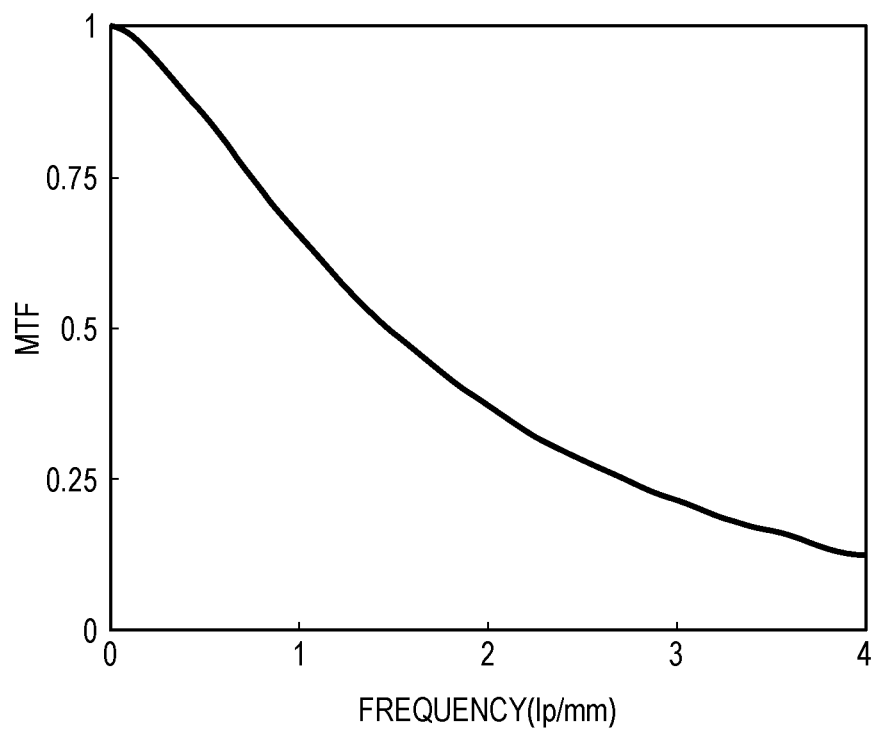
FIG. 12 is a view illustrating an example of the relationship between spatial frequency and MTF in a radiation detector.

In the radiation detector 10, since a configuration is adopted in which radiation is converted to visible light by the scintillator 11, it is known that attenuation of a high frequency according to the modulation transfer function (MTF) of the scintillator 11 occurs in a radiation signal. For example, FIG. 12 illustrates an example of the relationship between the MTF and the spatial frequency in the radiation detector 10 in which a pixel size is 125 μm. In this example, the MTF monotonously decreases towards the Nyquist frequency. The MTF at the Nyquist frequency of 41 p/mm is, for example, about 0.2, and the state is one in which the high frequency signal is attenuated.

Figure 6:
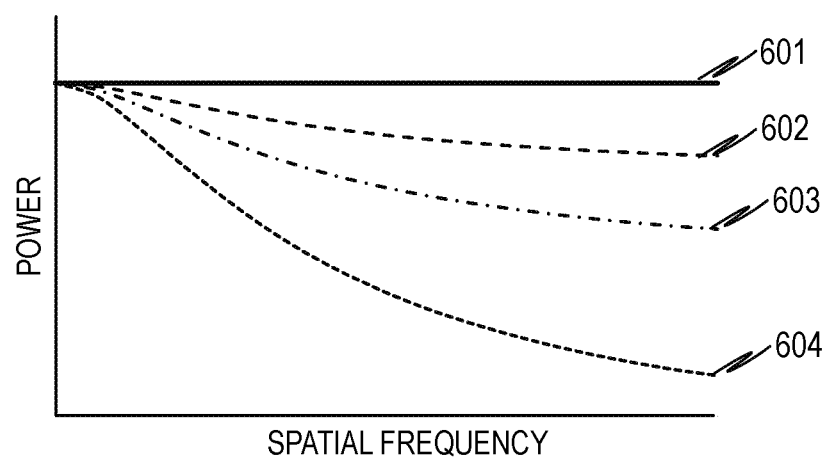
FIG. 6 is a view for describing spatial frequency characteristics of noise that differ depending on the radiation dose.

Similar attenuation of a high frequency according to the modulation transfer function also occurs in quantum noise generated by fluctuations in radiation quanta. On the other hand, system noise generated from the detector and circuits and the like is not affected by the scintillator. The noise included in a radiation image is made up of system noise that does not depend on the radiation dose during imaging, and quantum noise that changes depending on the radiation dose during imaging. For this reason, noise in a digital radiography apparatus has a characteristic such that a frequency characteristic (NPS: noise power spectrum) differs depending on the intensity of the radiation that is input. The relation between the NPS of the relevant noise and the strength of a signal (radiation dose) that is input is illustrated in FIG. 6. Note that, the ordinate axis in FIG. 6 represents the strength of an input signal, and the abscissa axis represents the spatial frequency of noise. A graph 601 illustrates an example of the spatial frequency characteristics of only system noise. A graph 604 illustrates an example of the spatial frequency characteristics of quantum noise according to the MTF of the scintillator 11. Graphs 602 and 603 each illustrate an example of the combined spatial frequency characteristics of system noise and spatial frequency characteristics of quantum noise.

In a case where there is no input signal, as illustrated in the graph 601, the noise has an NPS having a characteristic like that of white noise that is derived from system noise. In a case where the input signal is small, the noise has an NPS in which attenuation of a high frequency is small as illustrated in the graph 602, and in a case where the input signal is larger than in the graph 602, the noise has an NPS in which a high frequency is attenuated more as illustrated in the graph 603. Further, in a case where the input signal is sufficiently large and the quantum noise is dominant, the noise has an NPS according to the MTF of the scintillator 11 as illustrated in the graph 604.

In view of the circumstances described above, in the present embodiment, noise obtained by compositing white noise corresponding to system noise of the radiation detector 10 and quantum noise that is affected by the MTF of the scintillator 11 is treated as artificial noise.

Here, regarding the compositing ratio between quantum noise and system noise, for example, the characteristics of the radiation detector 10 can be simulated using the relational expressions of the following (Equation 1) to (Equation 4). Here, when the standard deviation of quantum noise is represented by $\sigma_q$, and the standard deviation of system noise produced by the radiation detector 10 is represented by $\sigma_s$, a variance $\sigma_{all}^2$ of noise in the radiation image satisfies the following relation:

$$\sigma_{all}^2 = \sigma_q^2 + \sigma_s^2 \quad \text{(Equation 1)}.$$

Further, when a signal of an input image is represented by $I_{sig}$, because the standard deviation $\sigma_q$ of quantum noise is proportional to the signal $I_{sig}$, the following relation can be written using a coefficient q of quantum noise:

$$\sigma_q^2 = q^2 \times I_{sig} \quad \text{(Equation 2)}.$$

Further, because the standard deviation $\sigma_s$ of system noise is a constant value that is not proportional to the signal $I_{sig}$, the following relation can be written using a coefficient s of system noise:

$$\sigma_s^2 = s^2 \quad \text{(Equation 3)}.$$

Based on the above circumstances, artificial noise (addNoise) can be obtained in the following manner. First, artificial system noise sNoise that simulates system noise is defined as additive white Gaussian noise (AWGN) with a standard deviation $\sigma_s$. Next, artificial quantum noise qNoise that simulates quantum noise is defined as noise having an NPS that follows a Poisson distribution with a variance $\sigma_q^2$, and is in accordance with the MTF of the scintillator 11. For example, when a value obtained by approximating the MTF of the scintillator 11 with a two-dimensional filter is defined as fMTF, the artificial quantum noise qNoise can be created by convoluting fMTF in a noise image that follows a Poisson distribution. Note that, since the Poisson distribution can be approximated to a normal distribution when the variance is sufficiently large, artificial quantum noise qNoise may be treated as noise following a normal distribution. At this time, the artificial noise (addNoise) can be expressed as follows:

$$\text{addNoise} = s\text{Noise} + q\text{Noise} \quad \text{(Equation 4)}.$$

It is known that the distribution of noise generated in a radiation image experimentally approximates a normal distribution in which the average value and the median are approximately 0, and in the case of artificial noise obtained as described above also, a distribution can be achieved in which the average value and the median are approximately 0.

Note that, the coefficients q and s are coefficients that represent the performance of the radiation detector 10, and can be obtained by performing measurement in advance. For example, measured values obtained by performing imaging a plurality of times while changing the radiation dose may be plotted, and the series of measured values may be approximated with (Equation 1) to obtain the coefficient q of quantum noise and the coefficient s of system noise. By this means, the standard deviation $\sigma_q$ of quantum noise and the standard deviation as of system noise in an arbitrary signal $I_{sig}$ can be obtained. However, a method for obtaining the standard deviation $\sigma_q$ of quantum noise and the standard deviation as of system noise is not limited to the above method, and any known method may be used. The standard deviation $\sigma_q$ of quantum noise and the standard deviation as of system noise may be stored in advance in the storage 25 for each radiation detector 10 used to obtain a radiation image, or may be obtained by measurement performed prior to imaging.

Further, although here a radiation detector 10 which uses a method referred to as an "indirect conversion method" which changes radiation to visible light by means of the scintillator 11 is illustrated as an example of the radiation detector 10, radiation detectors 10 also exist which use a method referred to as a "direct conversion method" which directly changes radiation to an electric signal. With regard to such radiation detectors 10 also, the quantum noise is equivalent in the respect that the quantum noise has an NPS influenced by the MTF, and it is possible to perform suitable training by adding artificial noise represented by the above (Equation 4) to the input data or the input data and the ground truth.

Figure 7A:
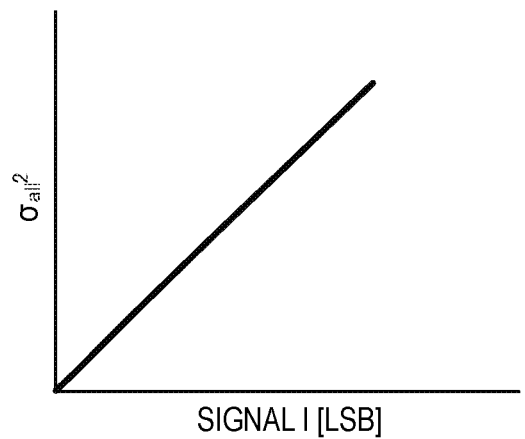
FIG. 7A is a view for describing noise decorrelating processing.
Figure 7B:
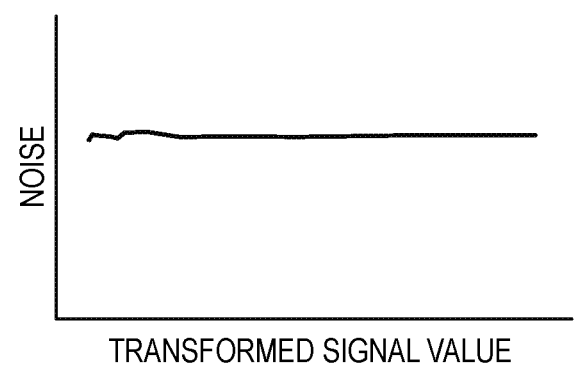
FIG. 7B is a view for describing noise decorrelating processing.

In step S404, the divided image to which artificial noise has been added is subjected to noise decorrelating processing by the decorrelating unit 264. Here, the noise decorrelating processing will be described referring to FIG. 7A and FIG. 7B. FIG. 7A is a view illustrating the relation between the variance of noise in a radiation image and an input signal of the image. FIG. 7B is a view illustrating the relation between a transformed signal value and noise after performing noise decorrelating processing. The term "noise decorrelating processing" refers to processing that eliminates the correlation between the variance of noise and the signal.

As described above, quantum noise that is proportional to the magnitude of the signal, and system noise that is not proportional to the magnitude of the signal are included in a radiation image, and as illustrated in (Equation 1) to (Equation 3) and FIG. 7A, there is a characteristic that the variance $\sigma_{all}^2$ of noise in a radiation image is proportional to the signal I. In order to more suitably perform training for noise reduction, rather than dealing with multiplicative noise whose magnitude changes depending on the signal I, it is desirable to transform noise into a format in which the noise is substantially constant regardless of the signal, as illustrated in FIG. 7B, and to deal with additive noise. Because quantum noise follows a Poisson distribution, by performing square-root transformation or logarithmic transformation or the like, quantum noise can be made approximately constant regardless of the intensity of the radiation that is input.

In the present embodiment, as noise decorrelating processing, based on the above (Equation 1) to (Equation 3), when a component $I_0$ of system noise is defined as $$I_0 = \frac{s^2}{q^2} \quad \text{(Equation 5)}$$

and an input image is represented by Im, a noise-decorrelated image Im' is obtained by subjecting the input image Im to square-root transform to give (Equation 6).

$$Im' = \sqrt{Im + I_0} \quad \text{(Equation 6)}$$

Note that, the decorrelating unit 264 may perform decorrelating processing according to the following (Equation 7) so that, in the square-root transform, the standard deviation of the noise after transform is made 1.

$$Im' = \frac{2 \times \sqrt{Im + I_0}}{q} \quad \text{(Equation 7)}$$

By means of such processing, with regard to noise included in the radiation image, the magnitude of the noise and the magnitude of the signal can be decorrelated.

In step S405, the DC removing unit 265 performs DC removing processing on the respective divided images that have been decorrelated, to thereby remove a direct-current component (average signal level of the image) of the respective divided images. Particularly in radiation images that are dealt with for medical use, the dynamic range of a signal of an object to be examined may be wide and an average signal level within an image may differ greatly depending on the divided region, and in some cases, this affects the loss function and training does not progress well. Therefore, in the present embodiment, a direct-current component is removed from the pixel values of a region image by the DC removing unit 265. Specifically, a direct-current component is removed in each divided image by subtracting the average pixel value of the divided image from each pixel value of the relevant image so that the average pixel value of the divided image becomes 0. By this operation, differences between average signal levels for each divided image can be equalized without affecting the magnitude of noise or the frequency characteristics of noise, and training can progress stably.

In step S406, inference processing is performed by the operation processing unit 266 using a machine learning model which the operation processing unit 266 possesses. In the present processing, the image created by the processing up to step S405 is adopted as the input, and the inference processing is performed using a machine learning model such as the aforementioned CNN. For example, as illustrated in FIG. 3C, a configuration can be adopted which, for example, uses a signal on which DC removing has been performed in step S405 as the input data 31, and outputs the inferred data 32.

Figure 3D:
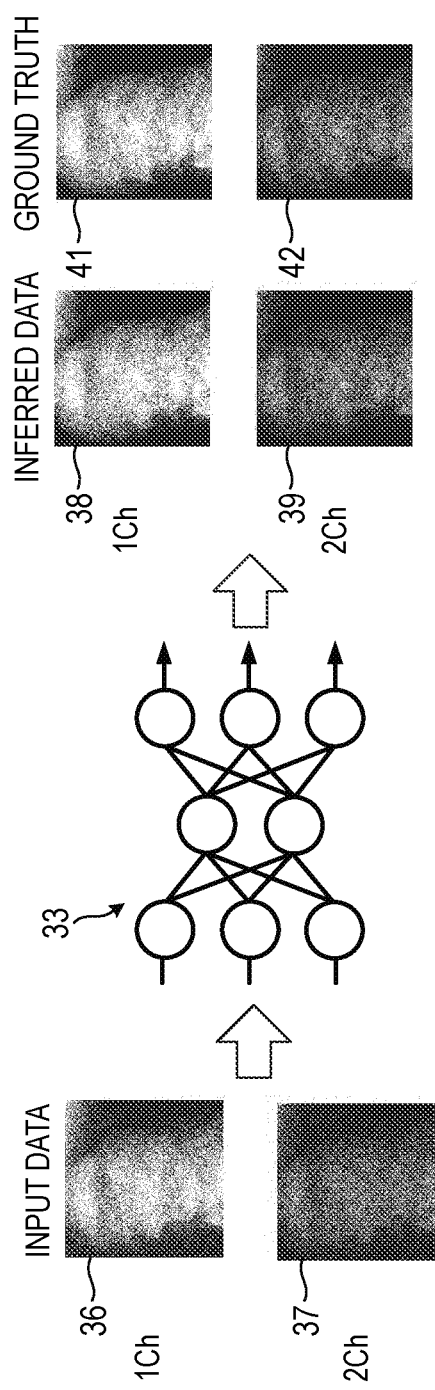
FIG. 3D is a view for describing an operative example of training processing according to Embodiment 1.
Figure 4:
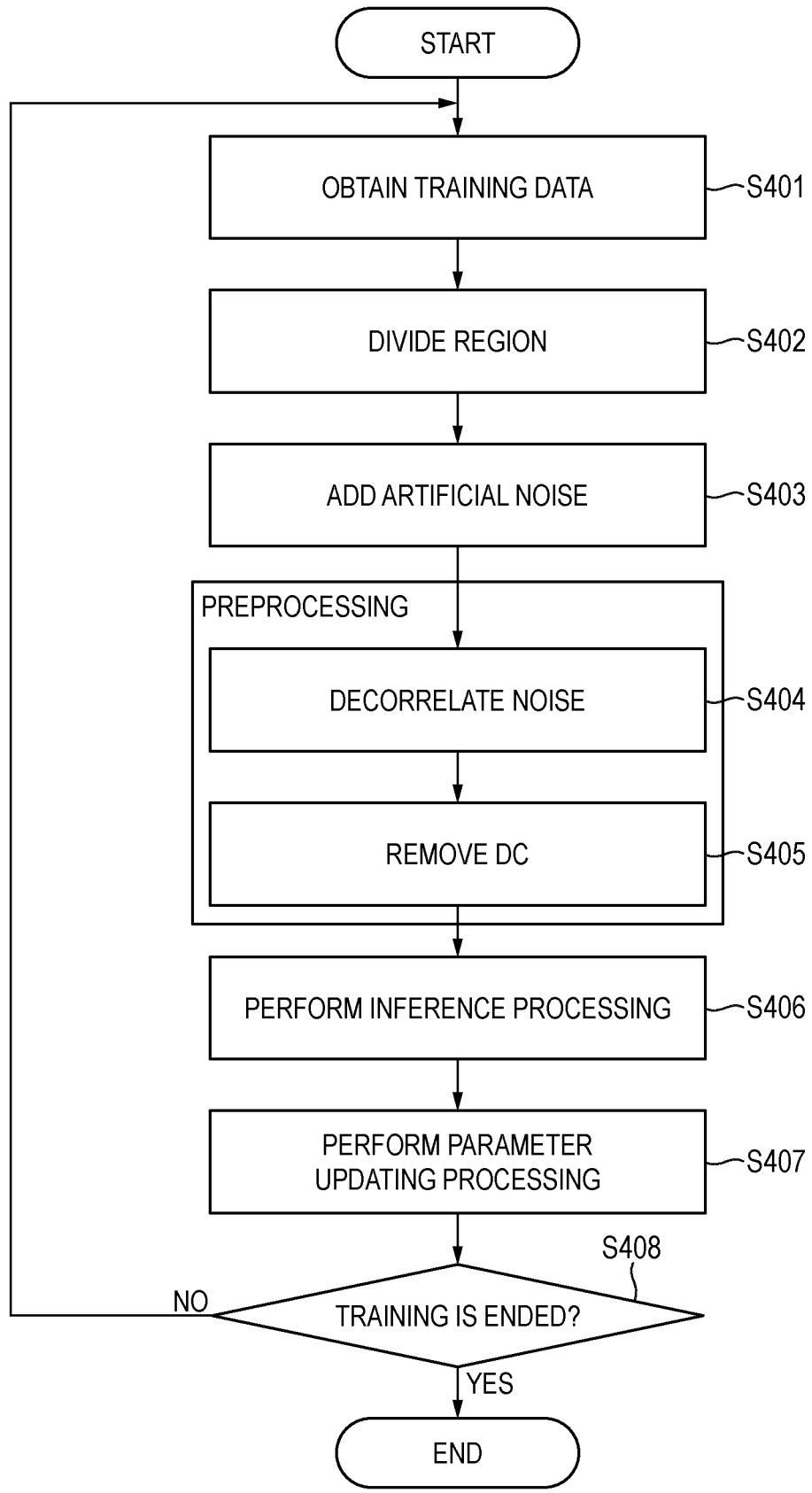
FIG. 4 is a flowchart of training processing according to Embodiment 1.

Alternatively, as illustrated in FIG. 3D, a configuration can also be adopted which has a plurality of channels (here, an example which has two channels is illustrated) for input data, and which has a plurality of channels for inferred data.

Here, considering the characteristics of noise that is the object to be learned, by performing the noise decorrelating processing in step S404, the variance (can also be referred to as "magnitude") of the noise becomes a state in which the variance of the noise becomes substantially constant regardless of the signal value. However, as mentioned above, taking into account the way in which noise occurs in a radiation image, the state is one in which the NPS of the noise still has a correlation with the signal amount that is input. Therefore, although it is desirable that information regarding the signal amount is input as information used for training, on the other hand, by performing the DC removing processing in step S405 that is performed in order to make the training consistent, a state is entered in which information regarding the signal amount has been lost.

In view of the above circumstances, an image that has been subjected to DC removing is input as input data 36 of a first channel, and in addition, an image which includes information regarding the signal amount is input as input data 37 of a second channel. For example, an image on which normalization has been performed in a state in which information regarding the signal amount has been stored in the image can be used with respect to an image on which noise decorrelating is performed in step S404. Specifically, a value can be used that has been normalized by dividing by a value obtained by performing the square root transformation of (Equation 6) or (Equation 7) using a maximum value max (Im) (for example, 65535) assumed in Im so that the maximum value becomes 0 to 1, as shown in the following (Equation 8).

$$Im'_{std} = \frac{\sqrt{Im + I_0}}{\sqrt{\max(Im) + I_0}} \quad \text{(Equation 8)}$$

Thus, training can be performed that includes information regarding the signal amount lost due to DC removal while stably proceeding with training, and hence the characteristics of noise can be learned in a more suitable manner. As the inferred data, a configuration is adopted that has inferred data 38 in which the noise of the input data 36 of the first channel from which DC has been removed has been reduced, and inferred data 39 in which the noise of the input data 37 of the second channel which included the information regarding the signal amount has been reduced.

Figure 3E:
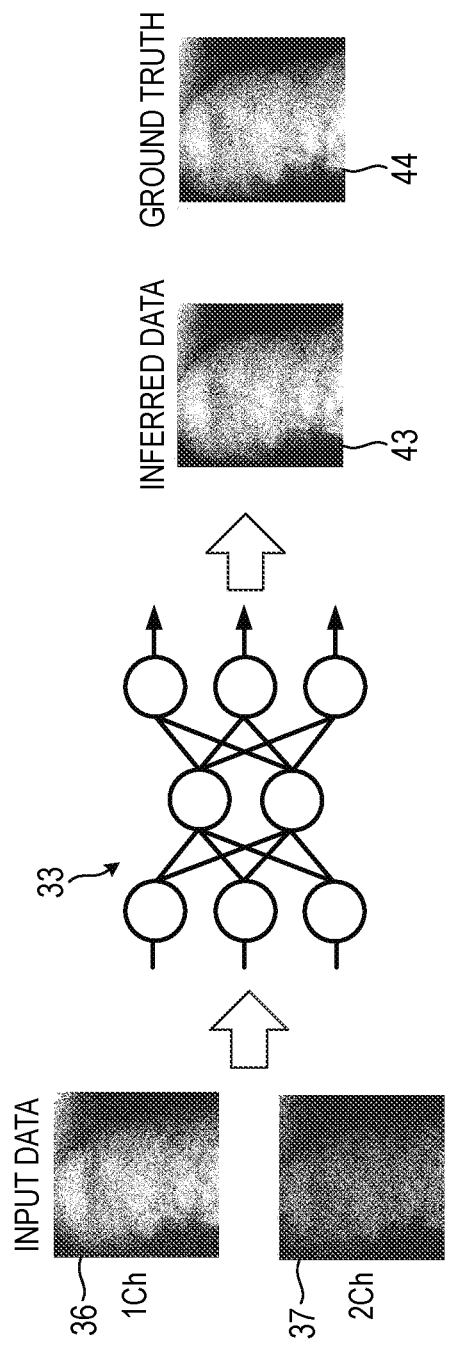
FIG. 3E is a view for describing an operative example of training processing according to Embodiment 1.

Alternatively, as illustrated in FIG. 3E, a configuration may be adopted which has a plurality of channels (here, an example with two channels is illustrated) for input data, and has one channel for inferred data. In this case, as the inferred data, a configuration can be adopted which has inferred data 43 in which the noise of the input data 36 of the first channel from which DC has been removed is reduced.

In step S407, the parameter updating unit 268 compares the inferred data and the ground-truth, and calculates a loss function that quantifies an error between the two. Further, parameters (for example, filter coefficients of a convolutional layer in a CNN) of the machine learning model are updated based on the loss function. Examples of the loss function that may be mentioned include a mean absolute error (L1loss) and a mean square error (L2loss). Note that, in a case where the inferred data is data of a single channel as illustrated in FIG. 3C, a pair of the inferred data 32 and the ground-truth 35 (and similarly in the example illustrated in FIG. 3E, a pair of the inferred data 43 and the ground-truth 44) are compared. In a case where the inferred data is data of a plurality of channels as illustrated in FIG. 3D, the parameter updating unit 268 compares each corresponding pair. Specifically, for example, the parameter updating unit 268 calculates a loss function between the inferred data 38 from which DC has been removed of the first channel and the ground-truth 41 which has been subjected to DC removing that corresponds to the inferred data 38, and calculates a loss function between the normalized inferred data 39 of the second channel and the normalized ground-truth 42 that corresponds to the inferred data 39.

Here, the distribution of the noise generated in the radiation image and the artificial noise added in step S403 can be approximated to a normal distribution in which the average value and the median are each 0. At this time, if the loss function is set to the mean absolute error (L1loss) or the mean square error (L2loss) as described above, components derived from noise are approximately canceled out by the averaging process in the loss function calculation. Therefore, the main factor that affects the loss function is the error of a signal component which includes no noise that is included in the data. That is, the machine learning model possessed by the operation processing unit 266 can adopt a configuration in which training proceeds so as to reproduce a signal which includes no noise from input data which includes noise.

In step S408, a determination as to whether or not training has ended is made, and if it is determined that training has ended, the processing flow is ended, while if it is determined that training has not ended the processing returns to step S401 to repeat the processing from step S401 to step S407 using different data. As the criterion for determining whether training has ended, it is possible to use an appropriate criterion that is generally used in general machine learning. For example, it may be determined whether or not a specific number of loops has been executed, whether or not the loss function is equal to or less than a certain level, whether or not overfitting is being performed, or PSNR or SSIM which are indexes that indicate the noise reduction performance in inferred data may be evaluated to determine whether or not the performance has reached a sufficient level.

As described above, by adding artificial noise that simulates the characteristics of noise in an actual radiation image to the input data or the input data and the ground truth, the training processing unit 261 in the present embodiment can generate a machine learning model which can output a radiation image in which noise has been favorably reduced.
(Inference Processing Unit)

Next, the flow of processing of the inference processing unit 262 according to the present embodiment is described referring to FIG. 3C to FIG. 3E, FIG. 5B, FIG. 5C and FIG. 9. FIG. 9 is a flowchart illustrating a series of image processing performed by the inference processing unit 262 according to the present embodiment.

In the series of image processing according to the present embodiment, a radiation image that is the object of processing is subjected to region dividing and preprocessing, and used as the input to a learned model. Thereafter, the output from the learned model is subjected to postprocessing corresponding to the preprocessing, and finally combination processing is performed on the divided images to generate a radiation image in which noise has been reduced that corresponds to the original radiation image. Note that, in the present embodiment, image processing performed on an image before being input to undergo inference processing is referred to as "preprocessing", and image processing performed on an image after being output after having undergone the inference processing is referred to as "postprocessing". In the present embodiment, the preprocessing includes noise decorrelating processing and DC removing processing, and the postprocessing includes DC adding processing that corresponds to the DC removing processing, and inverse-transform processing that corresponds to the noise decorrelating processing.

When the series of image processing according to the present embodiment is started, in step S901 the obtaining unit 21 obtains a radiation image. The obtaining unit 21 may obtain a radiation image generated by the radiation detector 10, or may obtain a radiation image from the storage 25 or the external storage apparatus 70 or the like.

In step S902, similarly to step S402, the dividing unit 263 performs region dividing processing on the obtained radiation image to generate a plurality of divided images (plurality of radiation images). Note that, as illustrated in FIG. 5B, in step S902 the dividing unit 263 divides the radiation image 501 into a plurality of divided images R11 to Rij. Note that, the number of pixels of each divided image is a number which is not greater than a number of pixels (for example, 256 pix×256 pix) on which processing can be performed completely at one time by the machine learning model which the operation processing unit 266 uses, and is a number which may be arbitrarily set as long as it is a number that is large enough to enable the extraction of feature amount relating to noise within the image.

Note that, as illustrated in FIG. 5B, the dividing unit 263 can set division regions in a manner so that the regions do not overlap. Further, as illustrated in FIG. 5C, the dividing unit 263 may be configured to set division regions in a manner so that portions of adjacent regions overlap, and so that overlapping portions can be composited when combining the divided images. In this case, in the combined radiation image, if slight differences in arithmetic operation results arise at boundaries of respective regions that have been combined, the influence of such differences can be lessened. Further, a convolution operation is performed in the inference processing, and to facilitate edge processing of the image at that time, a configuration may be adopted in which, as illustrated in FIG. 5C, an appropriate padding region 503 is provided in the radiation image 501, and subsequent processing may be performed after providing an appropriate padding region in the division regions also.

In step S903, similarly to step S404, the decorrelating unit 264 performs noise decorrelating processing on each divided image generated in step S902. Here, the decorrelating processing is performed using the same parameters as the parameters used in the decorrelating processing performed in the training processing. For example, if the standard deviation of the noise after transform has been made 1 in the manner shown in (Equation 7) in the training processing, the decorrelating processing can be similarly performed using (Equation 7).

Further, a configuration that changes the size of the standard deviation of the noise after transform can be adopted so that the effect of the noise reduction processing in the inference processing in step S905 can be changed. For example, transform may be performed so that noise becomes larger than in the decorrelating processing in the training processing, such as by making the standard deviation of the noise after transform 1.2 or the like. Because the learned model operates to reduce noise on the assumption that the noise is noise whose standard deviation is 1, an effect that alleviates the noise reduction effect can thus be obtained. According to the above configuration, by making the standard deviation in the transform processing different between the training processing and the inference processing, for example, the magnitude of the noise reduction effect can be adjusted according to the request of the diagnostician who performs diagnosis using the image on which the noise reduction processing has been performed.

In step S904, the DC removing unit 265 performs DC removing processing in a similar manner to step S405 on each divided image that has been subjected to noise decorrelating processing in step S903.

Next, in step S905, based on the divided image on which DC removing processing has been performed in step S904, the operation processing unit 266 uses the aforementioned learned model to perform inference processing to generate a divided image in which noise is reduced. Note that, it suffices that the learned model is a machine learning model on which training has been performed in advance, and it is not necessary for training to be performed for each relevant series of image processing. Note that, as illustrated in step S406 and FIG. 3C to FIG. 3E, the input applied to the operation processing unit 266 is in accordance with the learning model.

Further, although in the present embodiment a configuration is adopted in which the learned model is provided in the controlling unit 20, the learned model may be provided in the external storage apparatus 70 or the like that is connected to the controlling unit 20. Note that, the processing for generating a divided image in which noise is reduced by the operation processing unit 266 may include, for example, obtaining a radiation image in which noise has been reduced that has been generated based on a divided image sent from the controlling unit 20 using a learned model from the external storage apparatus 70 or the like.

The following steps are described taking a system as illustrated in FIG. 3E as an example. In the relevant system, an image on which DC removing processing has been performed is input to the first channel, and a divided image which has an image that underwent decorrelating processing which has been normalized so that the maximum value is 0 to 1 is input to the second channel. Further, in the system, an image obtained by performing noise reduction on the image on which the DC removing processing has been performed (noise reduction image of the first channel) is output.

Note that, it is possible to use units described hereunder to perform an adjustment with respect to the strength of the noise reduction processing in the inference processing. FIG. 8 is a schematic diagram showing one example of units for adjusting a noise reduction processing effect. As units for adjusting the strength of the noise reduction processing, an image 84 is used that is obtained by blending an input image 81 with an output image 83 of the inference processing by the machine learning model 82 using the learned model according to a specific coefficient α. The size of a (a is a real number from 0 to 1) may be changed according to the preference of the user. Note that, the adjustment processing may be performed, for example, by the inference processing unit 262 or the operation processing unit 266 or the like.

In step S906, the divided image in which noise is reduced that has been generated in step S905 is subjected to processing by the DC removing unit 265 to add thereto the direct-current component of the relevant divided image that has been removed in step S904.

In step S907, the decorrelating unit 264 subjects the divided image on which DC adding processing has been performed in step S906 to inverse-transform processing of the noise decorrelating processing performed in step S903. Specifically, if square-root transformation in accordance with (Equation 6) has been performed in step S903, when the divided image is represented by $Im_2$, the decorrelating unit 264 performs inverse-transform to give (Equation 9).

$$Im_2' = Im_2^2 - I_0 \qquad \text{(Equation 9)}$$

Further, if square-root transformation in accordance with (Equation 7) has been performed in step S903, when the divided image is represented by $Im_2$, the decorrelating unit 264 performs inverse-transform to give (Equation 10).

$$Im_2 = Im_2^2 \times \left(\frac{q}{2}\right)^2 - I_0 \qquad \text{(Equation 10)}$$

By performing the above processing, the respective pixel values in each divided image can be returned to a pixel value corresponding to the respective pixel values of each divided image prior to the noise decorrelating processing. However, since the relevant divided image has been subjected to noise reduction processing in step S905, each pixel value is a pixel value for which noise has been reduced.

In step S908, an end determination is performed, and if it is determined that postprocessing of all the divided images has been completed, the processing proceeds to step S909, and if not, the flow of processing from step S903 to step S907 is repeated.

In step S909, the dividing unit 263 arranges the respective divided images on which inverse-transform processing has been performed in step S907 at the respective positions of the divided images at the time that the radiation image has been divided when region dividing processing has been performed in step S902, and performs combination processing on the divided images to combine the plurality of divided images and generate an entire radiation image. Note that, in step S902, in a case where the divided images have been obtained by dividing so that portions of adjacent regions overlapped, it suffices to subject the overlapping portions to arithmetic averaging processing in which a distance from each original image is used as a weight or the like and perform the combination processing of the images so that a difference in level between pixel values does not occur at the overlapping portions.

After the combination processing is performed in step S909, the series of image processing according to the present embodiment ends. FIG. 10 illustrates an example of a radiation image 1001 before the series of image processing according to the present embodiment and a radiation image 1002 after the series of image processing. Comparing the radiation image 1001 and the radiation image 1002, it can be seen that noise included in the radiation image 1001 is reduced in the radiation image 1002 on which the series of image processing according to the present embodiment has been performed, and the object to be examined O included in the radiation image is clearly shown in the radiation image 1002.

Note that, in the present embodiment, a configuration is adopted in which, in step S404 and step S903, the decorrelating unit 264 performs square-root transformation as the noise decorrelating processing. However, the noise decorrelating processing is not limited to the aforementioned processing, and other processing may be used as long as it is processing that can stabilize the variance of a Poisson distribution. For example, the decorrelating unit 264 may perform noise decorrelating processing by performing logarithmic transformation of the radiation image. Specifically, when the radiation image (input image) is represented by Im, the decorrelating unit 264 performs logarithmic transformation of the radiation image to give (Equation 11).

$$Im'=\log(Im+I_0) \tag{Equation 11}$$

In this case, in the inverse-transform processing in step S907, when the radiation image is represented by $Im_2$, the decorrelating unit 264 performs inverse-transform with respect to the radiation image to give (Equation 12).

$$Im_2'=e^{IM_2}-I_0 \tag{Equation 12}$$

In this case also, the correlation of the noise included in the radiation image with the magnitude of the signal can be eliminated, and training by the machine learning model using training data based on such an image can be simplified.

Thus, in the series of image processing according to the present embodiment, by performing the processing of the inference processing unit 262 using a learned model created by the training processing unit 261, a radiation image can be generated on which favorable noise reduction has been performed in a digital radiography apparatus.

As described above, the controlling unit 20 according to the present embodiment includes the obtaining unit 21 and the operation processing unit 266. The obtaining unit 21 obtains a first radiation image of the object to be examined O. The operation processing unit 266 functions as one example of a generating unit that generates a second radiation image in which noise is reduced compared to the first radiation image, by inputting the first radiation image obtained by the obtaining unit 21 into a learned model obtained by training using training data including a radiation image obtained by adding noise with attenuated high-frequency components. Here, the noise includes noise with attenuated high-frequency components. Specifically, the noise includes noise that is in accordance with the modulation transfer function (MTF) of the scintillator 11 included in the radiation detector 10.

In the present embodiment, artificial noise includes, for example, noise obtained by compositing noise that simulates system noise of the radiation detector 10 such as additive white noise, and quantum noise for which the influence of the MTF on noise that follows a Poisson distribution is taken into consideration (noise with attenuated high-frequency components). For example, the artificial noise may include noise obtained by compositing noise that simulates system noise of the radiation detector 10 and noise with attenuated high-frequency components, at a predetermined compositing ratio. Further, for example, the artificial noise may include noise obtained by compositing noise that simulates system noise of the radiation detector 10 and noise with attenuated high-frequency components, at a compositing ratio that is determined using the relation between the variance of the entire noise included in a radiation image of the object to be examined O used for the training data, the variance of the system noise, the variance of the quantum noise, and the value of the signal of the radiation image. In addition, the artificial noise may include noise obtained by compositing noise that simulates system noise of the radiation detector 10 and noise with attenuated high-frequency components at a first compositing ratio, and noise obtained by compositing the aforementioned two kinds of noise at a second compositing ratio that is different from the first compositing ratio. Further, the artificial noise may include random noise and noise that is different from the random noise.

With the configuration described above, the controlling unit 20 according to the present embodiment can use a learned model to generate a radiation image in which noise that includes noise (noise with attenuated high-frequency components) that arises due to blurring ascribable to the scintillator is reduced from the radiation image. By using such a radiation image it is possible to support more appropriate performance of image analysis, and support appropriate image diagnosis by a physician.

The controlling unit 20 also includes the decorrelating unit 264. The decorrelating unit 264 functions as one example of a transforming unit that performs transform processing on a radiation image of the object to be examined O so as to stabilize the variance (make the variance approximately constant) of noise that follows a Poisson distribution which is included in the radiation image of the object to be examined O. The decorrelating unit 264 performs transform processing on a first radiation image, and the operation processing unit 266 generates a second radiation image based on the first radiation image on which the transform processing has been performed. Further, the decorrelating unit 264 performs inverse-transform processing of the transform processing on the second radiation image.

More specifically, the decorrelating unit 264 performs square-root transformation processing on the first radiation image, and performs inverse-transform processing of the square-root transformation processing on the second radiation image. According to this configuration, training by the machine learning model can be further simplified, and the accuracy of noise reduction processing using a learned model can be improved.

The controlling unit 20 also includes the DC removing unit 265. The DC removing unit 265 functions as one example of an adjusting unit that adjusts an average value of pixel values included in a radiation image of the object to be examined O. The DC removing unit 265 subtracts the average value of the pixel values from each pixel value included in the first radiation image on which transform processing has been performed by the decorrelating unit 264. The operation processing unit 266 generates a second radiation image based on the first radiation image from which the average value has been subtracted. The DC removing unit 265 adds the subtracted average value to each pixel value included in the second radiation image. The decorrelating unit 264 performs inverse-transform processing on the second radiation image to which the average value has been added. According to this configuration, variations in the brightness of each input image (radiation image) can be suppressed and the machine learning model can easily learn the characteristics of the shape (distribution) of noise in the images, and thus the accuracy of noise reduction processing using the learned model can be improved.

Note that, the training data can include a radiation image obtained by performing transform processing relating to noise decorrelating processing on a radiation image of an object to be examined O. Further, the training data can include a radiation image obtained by subtracting an average value of the pixel values from each pixel value included in a radiation image on which transform processing has been performed. In addition, the training data can include a radiation image obtained by performing square-root transformation so that the standard deviation of noise becomes larger than the standard deviation of noise in square-root transformation performed on the first radiation image.

Note that, the training data can include data in which a radiation image obtained by adding artificial noise to a radiation image of the object to be examined O is set as input data, and the radiation image of the object to be examined O is set as ground-truth. Further, the training data can include data in which a radiation image obtained by adding artificial noise to a radiation image on which transform processing relating to noise decorrelating processing has been performed is set as input data, and the radiation image on which the transform processing has been performed is set as ground-truth. In addition, the training data can include data in which a radiation image obtained by adding artificial noise to a radiation image in which an average value of pixel values has been subtracted is set as input data, and the radiation image in which the average value of pixel values has been subtracted is set as ground-truth.

The controlling unit 20 further includes the dividing unit 263. The dividing unit 263 functions as one example of a dividing unit that divides a radiation image into a plurality of radiation images. The dividing unit 263 divides a radiation image of an object to be examined O into a plurality of first radiation images. The operation processing unit 266 generates a plurality of second radiation images based on the plurality of first radiation images. The dividing unit 263 combines the plurality of second radiation images to generate a third radiation image in which noise is reduced. At such time, a radiation image used in the training data can include a plurality of radiation images obtained by dividing a radiation image of the object to be examined O. According to this configuration, even in a case where the number of pixels of a radiation image exceeds a number of pixels on which processing can be performed at one time by a learned model, a radiation image on which noise reduction processing has been performed can be generated.

Note that, in the present embodiment, in step S402 and step S902, the dividing unit 263 divides the obtained radiation image into a plurality of divided images. However, in a case where the number of pixels of the radiation image that is the object of the noise reduction processing is equal to or less than a number of pixels that can be processed at one time by the machine learning model, it is not necessary to perform the aforementioned dividing processing. In this case, it suffices to perform the processing from step S402 onward and the processing from step S902 onward with respect to the entire radiation image that has been obtained.

Note that, even in the case of performing processing on an entire radiation image, the DC removing processing in step S405 and step S904 and the DC adding processing in step S906 can be performed. In this case, variations in the brightness of respective radiation images can be suppressed, and the occurrence of a situation in which variations in the brightness of respective radiation images that are output from the learned model are emphasized can be suppressed.

Further, in the present embodiment, a configuration is adopted in which, in step S404 and step S903, the decorrelating unit 264 performs square-root transformation as noise decorrelating processing. However, the noise decorrelating processing is not limited to the aforementioned processing, and other processing may be used as long as it is processing that can stabilize the variance of a Poisson distribution. For example, the decorrelating unit 264 may perform noise decorrelating processing by performing logarithmic transformation of the radiation image. Specifically, when the radiation image (input image) is represented by Im, the decorrelating unit 264 performs logarithmic transformation of the radiation image to give (Equation 11).

$$Im' = \log(Im + I_0) \tag{Equation 11}$$

In this case, in the inverse-transform processing in step S907, when the radiation image is represented by $Im_2$, the decorrelating unit 264 performs inverse-transform with respect to the radiation image to give (Equation 12).

$$Im_2' = e^{Im_2} - I_0 \tag{Equation 12}$$

In this case also, the correlation of the noise included in the radiation image with the magnitude of the signal can be eliminated, and training by a machine learning model using training data based on such an image can be simplified.

Further, as described above, a training apparatus for performing training of the machine learning model or generation of training data may be provided separately from the controlling unit 20, and it suffices that the training apparatus has a configuration corresponding to the image processing unit 22 that functions as one example of the obtaining unit 21 and a training unit. Further, it suffices that the learned model is a machine learning model for which training has been performed in advance, and it is not necessary for training to be performed each time that image processing including noise reduction processing using the learned model is performed. Further, the learned model may be provided in the external storage apparatus 70 that is connected to the controlling unit 20, and for example, may be provided in a cloud server, a FOG server, an edge server or the like that is connected through the network 60 such as the Internet to the controlling unit 20.

Embodiment 2

Figure 11:
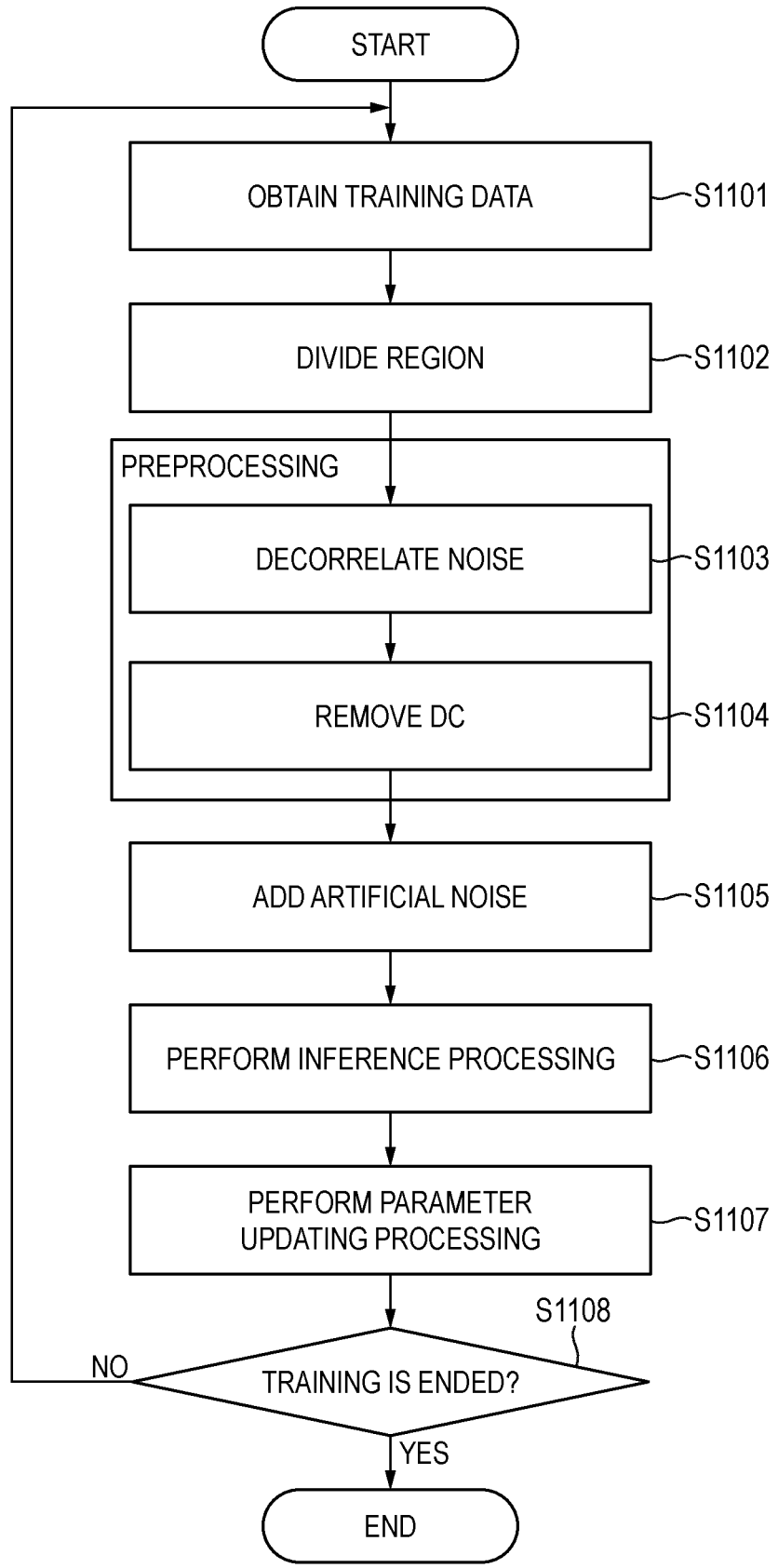
FIG. 11 is a flowchart of training processing according to Embodiment 2.

Next, a method for generating training data according to Embodiment 2 of the present disclosure is described referring to FIG. 11. As described above, in the training processing unit, the timing for adding artificial noise may be an arbitrary timing between respective processing operations performed in the inference processing unit. In the method for generating training data according to the present embodiment, processing for adding artificial noise is performed after preprocessing that includes noise decorrelating processing and DC removing processing. Note that, the training processing unit that generates training data has the same configuration as the training processing unit 261 described in Embodiment 1, and hence a description using reference numerals relating to the training processing unit 261 according to Embodiment 1 is omitted here.

Step S1101 and step S1102, and step S1103 and S1104 are the same as step S401 and step S402, and step S404 and step S405 relating to the method for generating training data according to Embodiment 1. In step S1105, the artificial noise adding unit 267 adds artificial noise to the image after undergoing the DC removing processing in step S1104. Therefore, in the artificial noise adding processing (step S1105) according to the present embodiment, the artificial noise adding unit 267 adds artificial noise addNoise2 that is different to the artificial noise addNoise according to Embodiment 1.

Hereunder, the artificial noise addNoise2 is described in more detail. First, artificial system noise sNoise2 that simulates system noise is defined as AWGN. Further, artificial quantum noise qNoise2 that simulates quantum noise is defined as noise that follows a Poisson distribution and in which the spatial frequency characteristics are in accordance with the MTF of the scintillator 11. In the present embodiment, when a value obtained by approximating the MTF of the scintillator 11 with a two-dimensional filter is defined as fMTF, fMTF is convoluted in a noise image pNoise that follows a Poisson distribution to give the following (Equation 13):

$$qNoise2 = pNoise \times fMTF \quad \text{(Equation 13)}.$$

In this case, when α represents the compositing ratio, the artificial noise addNoise2 that is added according to the present embodiment can be made artificial noise given by the following (Equation 14).

$$addNoise2 = \alpha \times qNoise2 + \sqrt{1-\alpha^2} \times sNoise2 \quad \text{(Equation 14)}$$

Here, the compositing ratio α takes a value of 0 to 1, and can be applied as an appropriate fixed value or a value (arbitrary value) that is randomly changed. However, the standard deviation of the artificial system noise sNoise2, the standard deviation of the artificial quantum noise qNoise2, and the standard deviation of the artificial noise addNoise2 which is added are to be made the same. Here, in step S1103, for example, in a case where the standard deviation is normalized to 1 according to (Equation 7), it suffices to adopt a configuration so that the standard deviation of the artificial system noise sNoise2, the standard deviation of the artificial quantum noise qNoise2, and the standard deviation of the artificial noise addNoise2 that is added become 1.

Further, the compositing ratio α may be determined according to the signal $I_{sig}$ of the radiation image using the relation between the noise and the signal represented by (Equation 1) relating to the variance $\sigma_{all}^2$ of noise in the radiation image. For example, when the following (Equation 15) is given, $$\beta = \sqrt{(I_{sig} \times q^2)} \quad \text{(Equation 15)}$$

the following (Equation 16) can be given.

$$\alpha = \frac{\beta}{\sqrt{s^2 + \beta^2}} \quad \text{(Equation 16)}$$

Note that, the above method for determining the compositing ratio α using the relation between the noise and the signal represented by (Equation 1) is one example, and apart from this method, the compositing ratio α may also be determined according to the relation between the signal and noise represented by (Equation 1) and the signal $I_{sig}$.

The artificial noise adding unit 267 adds the artificial noise addNoise2 determined in this way to a divided image $Im_e'$ from which DC has been removed in step S1104 to obtain a divided image represented by (Equation 17).

$$Im_{add} = Im_e' + addNoise2 \quad \text{(Equation 17)}$$

In the present embodiment, the divided image $Im_e'$ from which DC has been removed in step S1104 is adopted as the ground-truth of the training data, and the divided image $Im_{add}$ to which the artificial noise addNoise2 has been added in step S1105 is adopted as the input data of the training data. A learned model that is obtained by training such training data can learn a tendency of the characteristics of artificial noise corresponding to noise generated in a radiation image, and can output a radiation image in which noise has been reduced from the radiation image.

The subsequent step S1106, step S1107, and step S1108 are the same as step S406, step S407, and step S408 according to Embodiment 1.

As described above, in the present embodiment, for the input data of the training data, the artificial noise addNoise2 that is obtained by adding (compositing) the artificial system noise sNoise2 and the artificial quantum noise qNoise2 simulating quantum noise is added to a radiation image after noise decorrelating processing. In a case where training is performed according to this sequence of processing also, similarly to Embodiment 1, the training processing unit 261 can create an appropriate learned model, and a radiation image can be generated that has been subjected to favorable noise reduction in the digital radiography apparatus by performing the processing of the inference processing unit 262. Note that although an example in which the addition of artificial noise is performed after DC removing is described here, a similar effect can be obtained even if the addition of artificial noise is performed after noise decorrelating.

(Modification 1)

A learned model to be used for noise reduction processing may be prepared for each kind of object to be examined O in a radiation image on which noise reduction processing is performed. For example, learned models for which a radiation image in which the chest and abdomen parts of the human body have been set as objects to be examined O has been used as training data, and learned models for which a radiation image in which objects pertaining to nondestructive examination have been set as objects to be examined O has been used as training data may be prepared. In this case, the operation processing unit 266 can select a learned model to be used for noise reduction processing according to each kind of object to be examined O in the radiation image on which processing is to be performed.

Because a feature portion in an image will also differ for each kind of object to be examined O, by preparing learned models for each kind of object to be examined O in this way, the operation processing unit 266 can generate a radiation image in which noise has been reduced more appropriately according to the kind of object to be examined O. Further, similarly, learned models may be prepared for each object to be examined O, for example, for each patient or for each imaging site, or for each kind of object of nondestructive examination. Note that, similarly to Modification 2 to be described later, these learned models may be generated by performing transfer learning, or may be generated by training using respective sets of training data for the respective learned models.

(Modification 2)

With regard to a learned model to be used for noise reduction processing, training may be performed that is adjusted (tuned) for each radiation detector to generate a dedicated learned model for the relevant radiation detector. For example, transfer learning using a radiation image obtained by a certain radiation detector can be performed by a general-purpose learned model for generating a radiation image in which noise is reduced to thereby generate a dedicated learned model for the radiation detector in question. Further, dedicated learned models for respective radiation detectors can be stored in association with the ID of the corresponding radiation detector in the storage 25 or the external storage apparatus 70 such as a server or the like. In this case, when performing noise reduction processing on a radiation image obtained using a radiation detector, the controlling unit 20 can identify and utilize, from a plurality of learned models, the dedicated learned model for the relevant radiation detector based on the ID of the radiation detector. The accuracy of noise reduction processing can be improved by using such a dedicated learned model for a radiation detector. Note that, a method for generating a dedicated learned model for respective radiation detectors is not limited to transfer learning, and respective learned models may be generated by training with training data that uses a radiation image obtained using the respective radiation detectors.

Further, with respect to a radiation image on which noise reduction processing is performed using a learned model, the operation processing unit 266 may input the radiation image to a learned model after transforming the radiation image based on the MTF of the scintillator of the radiation detector used to obtain the radiation image. In a case where the MTF of the scintillator of the radiation detector used to obtain a radiation image on which to perform noise reduction is different from the MTF of the scintillator of the radiation detector used to obtain a radiation image used in the training data, there is a possibility that the effect of the noise reduction processing will not be favorable. Therefore, the operation processing unit 266 may transform the radiation image according to a ratio of the MTF of the scintillator included in the radiation detector used to obtain the radiation image on which noise reduction processing is to be performed to the MTF of the scintillator included in the radiation detector used to obtain the radiation image used in the training data.

In this case, the operation processing unit 266 inputs the transformed radiation image into the learned model. Further, the operation processing unit 266 transforms the radiation image in which noise has been reduced that has been output from the learned model, using the inverse of the ratio of the MTFs of the relevant scintillators. By this means, in a case where the MTF of the scintillator of the radiation detector used to obtain the radiation image on which to perform noise reduction is different from the MTF of the scintillator of the radiation detector used to obtain the radiation image used in the training data, the occurrence of a situation in which the effect of the noise reduction weakens can be suppressed. Note that, it suffices to perform the relevant transform processing of the radiation image before the noise reduction processing (step S905). Further, it suffices to perform the relevant inverse-transform processing of the radiation image in a sequence that corresponds to the sequence of the processing in which the relevant transform of the radiation image is performed, at a timing after the noise reduction processing (step S905). For example, in a case where the relevant transform processing is performed before the decorrelating processing of noise (step S903), it suffices to perform the relevant inverse-transform processing after the inverse-transform processing (step S907) relating to the decorrelating processing of noise. Note that, separate components for performing noise reduction processing, transform processing on the relevant radiation image, and the inverse-transform processing corresponding thereto, respectively, may be provided, and in this case a functional block that includes the respective components can be adopted as the operation processing unit 266.

(Modification 3)

With respect to the machine learning model that the operation processing unit 266 uses, any layer configurations such as a variational auto-encoder (VAE), a fully convolutional network (FCN), a SegNet, or a DenseNet can also be combined and used as the configuration of the CNN. In a common neural network, by configuring each unit (each neuron or each node) so as to output a scalar value, the neural network is configured so that, for example, spatial information relating to spatial positional relationships (relative positions) between features in an image is reduced. By this means, for example, training can be performed in which the influence of local distortion or parallel displacement or the like in an image is reduced. On the other hand, in a capsule network, for example, a configuration is adopted so that spatial information is held, by configuring each unit (each capsule) so as to output spatial information as a vector. By this means, for example, training can be performed in which spatial positional relationships between features in an image is taken into consideration.

(Modification 4)

Further, the training data of various learned models is not limited to data obtained using the radiation detector that itself performs the actual imaging, and depending on the desired configuration, the training data may be data obtained using a radiation detector of the same model, or data obtained using a radiation detector of the same type or the like. Note that, in the learned models for noise reduction processing according to the various embodiments and modifications described above, for example, it is conceivable for the magnitude of luminance values of a radiation image, as well as the order and slope, positions, distribution, and continuity of bright sections and dark sections and the like of a radiation image to be extracted as a part of the feature amount and to be used for estimation processing pertaining to generation of a radiation image in which noise has been reduced.

In addition, the learned models according to the various embodiments and modifications described above can be provided in the controlling unit 20. These learned models, for example, may be constituted by a software module that is executed by a processor such as a CPU, an MPU, a GPU or an FPGA, or may be constituted by a circuit that serves a specific function such as an ASIC. Further, these learned models may be provided in a different apparatus such as a server that is connected to the controlling unit 20. In this case, the controlling unit 20 can use the learned models by connecting to the server or the like that includes the learned models through any network such as the Internet. Here, the server that includes the learned models may be, for example, a cloud server, a FOG server, or an edge server.

According to the above-described embodiments and modifications of the present disclosure, favorable noise reduction processing can be performed in a digital radiography apparatus.

Other Embodiments

In the embodiments of the present invention described above, a dipole antenna or an inverted-F antenna is applied as the antenna, but the antenna in the present invention is not limited to a dipole antenna and an inverted-F antenna; as the antenna, what is called an inverted-L antenna or a monopole antenna is also applicable. In a case where a monopole antenna is applied, the antenna further includes, in addition to an antenna element, a ground conductor portion (or an electric conductor portion formed of an electric conductor) to be used as a ground of the antenna element and has a configuration in which one end portion of the antenna element forms an open end portion, and an electric supply unit is provided between the other end portion and the ground conductor portion (or the electric conductor portion). In a case where an inverted-L antenna is applied, the antenna further includes, in addition to an antenna element, a ground conductor portion (or an electric conductor portion formed of an electric conductor) to be used as a ground of the antenna element and has a configuration in which one end portion of the antenna element forms an open end portion, the antenna has a crank shape between the one end portion and the other end portion, and an electric supply unit is provided between the other end portion and the ground conductor portion (or the electric conductor portion).

In this case, the processor or circuit may include a central processing unit (CPU), a microprocessing unit (MPU), a graphics processing unit (GPU), an application specific integrated circuit (ASIC), or a field programmable gateway (FPGA). Further, the processor or circuit may include a digital signal processor (DSP), a data flow processor (DFP) or a neural processing unit (NPU).

The present disclosure includes the following configurations, methods, and a program.

(Configuration 1)

An image processing apparatus, comprising:

an obtaining unit configured to obtain a first radiation image of an object to be examined; and a generating unit configured to, by inputting a first radiation image obtained by the obtaining unit into a learned model, generate a second radiation image in which noise is reduced compared to the first radiation image, wherein the learned model is obtained by training using training data including a radiation image obtained by adding noise with attenuated high-frequency components.

(Configuration 2)

The image processing apparatus according to the configuration 1, wherein the generating unit is configured to generate the second radiation image by inputting the first radiation image into a learned model obtained by training using training data including a radiation image obtained by adding the noise with attenuated high-frequency components according to a modulation transfer function of a scintillator included in a radiation detector.

(Configuration 3)

The image processing apparatus according to the configuration 1 or 2, wherein the generating unit is configured to generate the second radiation image by inputting the first radiation image into a learned model obtained by training using training data including a radiation image obtained by adding artificial noise including noise simulating system noise of a radiation detector and the noise with attenuated high-frequency components.

(Configuration 4)

The image processing apparatus according to the configuration 3, wherein the artificial noise includes noise obtained by compositing, at a predetermined compositing ratio, the noise simulating system noise of a radiation detector and the noise with attenuated high-frequency components.

(Configuration 5)

The image processing apparatus according to the configuration 4, wherein the generating unit is configured to generate the second radiation image by inputting the first radiation image into a learned model obtained by training using training data including a radiation image obtained by adding artificial noise obtained by compositing, at a first compositing ratio, the noise simulating system noise of a radiation detector and the noise with attenuated high-frequency components, and a radiation image obtained by adding artificial noise obtained by compositing, at a second compositing ratio that is different from the first compositing ratio, the noise simulating system noise of the radiation detector and the noise with attenuated high-frequency components.

(Configuration 6)

The image processing apparatus according to any one of the configurations 3 to 5, wherein an average value or a median of the artificial noise is 0.

(Configuration 7)

The image processing apparatus according to any one of the configurations 1 to 6, further comprising:

a transforming unit configured to perform transform processing on a radiation image of an object to be examined so as to stabilize a variance of noise that follows a Poisson distribution which is included in the radiation image of the object to be examined, wherein:

the transforming unit is configured to perform the transform processing on the first radiation image;

the generating unit is configured to generate the second radiation image based on the first radiation image on which the transform processing is performed; and the transforming unit is configured to perform inverse-transform processing of the transform processing on the second radiation image.

(Configuration 8)

The image processing apparatus according to the configuration 7, wherein the transforming unit is configured to:

perform square-root transformation processing on the first radiation image; and perform inverse-transform processing of square-root transformation processing on the second radiation image.

(Configuration 9)

The image processing apparatus according to the configuration 7 or 8, further comprising:

an adjusting unit configured to adjust an average value of pixel values included in a radiation image of an object to be examined, wherein:

from each of pixel values included in the first radiation image on which the transform processing is performed, the adjusting unit is configured to subtract an average value of the pixel values;

the generating unit is configured to generate the second radiation image based on the first radiation image from which the average value is subtracted;

the adjusting unit is configured to add the average value to each of pixel values included in the second radiation image; and the transforming unit performs the inverse-transform processing on the second radiation image to which the average value is added.

(Configuration 10)

The image processing apparatus according to any one of the configurations 7 to 9, wherein the training data includes a radiation image obtained by performing the transform processing on a radiation image of an object to be examined.

(Configuration 11)

The image processing apparatus according to the configuration 10, wherein the training data includes a radiation image on which square-root transformation has been performed so that a standard deviation of noise becomes larger than a standard deviation of noise with respect to square-root transformation that is performed on the first radiation image.

(Configuration 12)

The image processing apparatus according to any one of the configurations 7 to 11, wherein the training data includes a radiation image obtained by subtracting an average value of pixel values included in a radiation image on which the transform processing is performed from each of the pixel values.

(Configuration 13)

The image processing apparatus according to the configuration 12, wherein the training data includes, as input data, a radiation image obtained by performing normalization processing on a radiation image on which the transform processing is performed, and a radiation image obtained by subtracting an average value of pixel values included in the radiation image on which the transform processing is performed from each of the pixel values.

(Configuration 14)

The image processing apparatus according to any one of the configurations 1 to 13, wherein the training data includes data in which a radiation image obtained by adding the noise to a radiation image of an object to be examined is set as input data, and a radiation image of an object to be examined is set as ground-truth.

(Configuration 15)

The image processing apparatus according to any one of the configurations 7 to 13, wherein the training data includes data in which a radiation image obtained by performing the transform processing on a radiation image to which the noise is added is set as input data, and a radiation image on which the transform processing is performed is set as ground-truth.

(Configuration 16)

The image processing apparatus according to the configuration 9 or 12, wherein the training data includes data in which a radiation image obtained by subtracting the average value of the pixel values from a radiation image to which the noise is added is set as input data, and a radiation image in which the average value of the pixel values is subtracted is set as ground-truth.

(Configuration 17)

The image processing apparatus according to any one of the configurations 7 to 13, wherein the training data includes data in which a radiation image obtained by performing the transform processing on a radiation image of an object to be examined to which the noise is added is set as input data, and a radiation image obtained by performing the transform processing on a radiation image of an object to be examined is set as ground-truth.

(Configuration 18)

The image processing apparatus according to the configuration 9 or 12, wherein the training data includes data in which a radiation image obtained by subtracting an average value of pixel values included in a radiation image obtained by performing the transform processing on a radiation image of an object to be examined to which the noise is added, from each of the pixel values, is set as input data, and a radiation image obtained by subtracting an average value of pixel values included in a radiation image obtained by performing the transform processing on a radiation image of an object to be examined from each of the pixel values is set as ground-truth.

(Configuration 19)

The image processing apparatus according to any one of the configurations 1 to 18, further comprising:
a dividing unit configured to divide a radiation image into a plurality of radiation images,
wherein:
the dividing unit is configured to divide a radiation image of an object to be examined into a plurality of first radiation images;
the generating unit is configured to generate a plurality of second radiation images based on the plurality of first radiation images; and
the dividing unit is configured to combine the plurality of second radiation images to generate a third radiation image in which noise is reduced.

(Configuration 20)

The image processing apparatus according to any one of the configurations 1 to 19, wherein a radiation image that is used in the training data includes a plurality of radiation images obtained by dividing a radiation image of an object to be examined.

(Configuration 21)

The image processing apparatus according to any one of the configurations 1 to 20, wherein the generating unit is configured to:
transform the first radiation image according to a ratio of a modulation transfer function of a scintillator included in a radiation detector used to obtain the first radiation image with respect to a modulation transfer function of a scintillator included in a radiation detector used to obtain a radiation image of an object to be examined that is used in the training data;
generate the second radiation image from the transformed first radiation image using the learned model; and
transform the second radiation image according to an inverse of the ratio.

(Configuration 22)

The image processing apparatus according to any one of the configurations 1 to 21, wherein the learned model includes a neural network including a U-shaped configuration that has an encoder function and a decoder function, and the neural network has an adding layer configured to add input data to data that is output from a first convolutional layer on a decoder side.

(Configuration 23)

An image processing apparatus comprising:
a generating unit configured to, by inputting a first radiation image to a learned model, generates a second radiation image in which noise is reduced compared to the first radiation image, wherein the learned model obtained by training using training data including a radiation image of an object to be examined and a radiation image obtained by adding random noise and noise that is different from the random noise to the radiation image.

(Configuration 24)

A training apparatus, comprising:
a training unit configured to train a machine learning model using training data that includes a radiation image obtained by adding noise with attenuated high-frequency components.

(Configuration 25)

The training apparatus according to the configuration 24, further comprising:
a transforming unit configured to perform transform processing on a radiation image of an object to be examined so as to stabilize a variance of noise that follows a Poisson distribution which is included in the radiation image of an object to be examined,
wherein:
the training unit is configured to train the machine learning model using training data that uses a radiation image of an object to be examined on which the transform processing is performed by the transforming unit.

(Configuration 26)

The training apparatus according to the configuration 25, further comprising:

an adjusting unit configured to adjust an average value of pixel values included in a radiation image of an object to be examined, wherein:

from each of pixel values included in a radiation image of an object to be examined on which the transform processing is performed, the adjusting unit is configured to subtract an average value of the pixel values; and the training unit is configured to train the machine learning model using training data that uses the radiation image of an object to be examined from which the average value is subtracted.

(Configuration 27)

The training apparatus according to any one of the configurations 24 to 26, further comprising:

a dividing unit configured to divide a radiation image of an object to be examined into a plurality of radiation images, wherein:

the training unit is configured to train a machine learning model using training data that uses a plurality of radiation images divided by the dividing unit.

(Method 1)

An image processing method, comprising:

obtaining a first radiation image of an object to be examined; and generating, by inputting the obtained first radiation image into a learned model, a second radiation image in which noise is reduced compared to the first radiation image, wherein the learned model is obtained by training using training data that includes a radiation image obtained by adding noise with attenuated high-frequency components.

(Method 2)

The image processing method according to the method 1, further comprising:

performing transform processing on the first radiation image so as to stabilize a variance of noise that follows a Poisson distribution that is included in the first radiation image; and performing inverse-transform processing of the transform processing on the second radiation image, wherein:

the generating the second radiation image includes generating the second radiation image based on the first radiation image on which the transform processing is performed.

(Method 3)

The image processing method according to the method 2, further comprising:

subtracting an average value of pixel values included in the first radiation image on which the transform processing is performed from each of the pixel values; and adding the average value to each pixel value included in the second radiation image, wherein:

the generating the second radiation image includes generating the second radiation image based on the first radiation image from which the average value is subtracted; and the performing the inverse-transform processing includes performing the inverse-transform processing on the second radiation image to which the average value is added.

(Method 4)

The image processing method according to any one of the methods 1 to 3, further comprising:

dividing a radiation image of an object to be examined into a plurality of first radiation images; and combining a plurality of second radiation images to generate a third radiation image in which noise is reduced, wherein:

the generating the second radiation image includes generating a plurality of second radiation images based on the plurality of first radiation images.

(Method 5)

A training method, comprising:

training a machine learning model using training data including a radiation image obtained by adding noise with attenuated high-frequency components.

(Method 6)

The training method according to the method 5, further comprising:

performing transform processing on a radiation image of an object to be examined so as to stabilize a variance of noise that follows a Poisson distribution that is included in the radiation image of an object to be examined, wherein:

the training includes training the machine learning model using training data that uses the radiation image of an object to be examined on which the transform processing is performed.

(Method 7)

The training method according to the method 6, further comprising:

subtracting an average value of pixel values included in a radiation image of an object to be examined on which the transform processing is performed from each of the pixel values, wherein:

the training includes training the machine learning model using training data that uses the radiation image of an object to be examined from which the average value is subtracted.

(Method 8)

The training method according to any one of the methods 5 to 7, further comprising:

dividing a radiation image of an object to be examined into a plurality of radiation images, wherein:

the training includes training a machine learning model using training data that uses the divided plurality of radiation images.

(Program 1)

A program that, when executed by a computer, causes the computer to execute respective steps of the image processing method according to any one of the methods 1 to 4.

(Program 2)

A program that, when executed by a computer, causes the computer to execute respective steps of the training method according to any one of the methods 5 to 8.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus, comprising:
a processor; and
a memory, including instructions stored thereon, which when executed by the processor, cause the image processing apparatus to:
obtain a first radiation image of an object to be examined; and
by inputting the first radiation image into a learned model, generate a second radiation image in which noise is reduced compared to the first radiation image, wherein the learned model is obtained by training using training data including a radiation image obtained by adding noise with reduced high-frequency components compared to low-frequency components,
wherein the first radiation image is obtained by a radiation detector including a scintillator.

2. The image processing apparatus according to claim 1, wherein the second radiation image is generated by inputting the first radiation image into a learned model obtained by training using training data including a radiation image obtained by adding the noise with reduced high-frequency components according to a modulation transfer function of a scintillator included in a radiation detector.

3. The image processing apparatus according to claim 1, wherein the second radiation image is generated by inputting the first radiation image into a learned model obtained by training using training data including a radiation image obtained by adding artificial noise including noise simulating system noise of a radiation detector and the noise with reduced high-frequency components.

4. The image processing apparatus according to claim 3, wherein the artificial noise includes noise obtained by compositing, at a predetermined compositing ratio, the noise simulating system noise of a radiation detector and the noise with reduced high-frequency components.

5. The image processing apparatus according to claim 4, wherein the second radiation image is generated by inputting the first radiation image into a learned model obtained by training using training data including a radiation image obtained by adding artificial noise obtained by compositing, at a first compositing ratio, the noise simulating system noise of a radiation detector and the noise with reduced high-frequency components, and a radiation image obtained by adding artificial noise obtained by compositing, at a second compositing ratio that is different from the first compositing ratio, the noise simulating system noise of the radiation detector and the noise with reduced high-frequency components.

6. The image processing apparatus according to claim 3, wherein an average value or a median of the artificial noise is 0.

7. The image processing apparatus according to claim 1, wherein the instructions, when executed by the processor, further cause the image processing apparatus to:
perform transform processing on a radiation image of an object to be examined so as to stabilize a variance of noise that follows a Poisson distribution which is included in the radiation image of the object to be examined,
wherein:
the transform processing is performed on the first radiation image;
the second radiation image is generated based on the first radiation image on which the transform processing is performed; and
inverse-transform processing of the transform processing is performed on the second radiation image.

8. The image processing apparatus according to claim 7, wherein the training data includes a radiation image obtained by performing the transform processing on a radiation image of an object to be examined.

9. The image processing apparatus according to claim 1, wherein the training data includes data in which a radiation image obtained by adding the noise to a radiation image of an object to be examined is set as input data, and a radiation image of an object to be examined is set as ground-truth.

10. The image processing apparatus according to claim 7, wherein the training data includes data in which a radiation image obtained by performing the transform processing on a radiation image of an object to be examined to which the noise is added is set as input data, and a radiation image obtained by performing the transform processing on a radiation image of an object to be examined is set as ground-truth.

11. The image processing apparatus according to claim 1, wherein the instructions, when executed by the processor, further cause the image processing apparatus to:
divide a radiation image into a plurality of radiation images of regions,
wherein:
a radiation image of an object to be examined is divided into a plurality of first radiation images;
a plurality of second radiation images is generated based on the plurality of first radiation images; and
the plurality of second radiation images is combined to generate a third radiation image in which noise is reduced.

12. The image processing apparatus according to claim 1, wherein a radiation image that is used in the training data includes a plurality of radiation images of regions obtained by dividing a radiation image of an object to be examined.

13. The image processing apparatus according to claim 1, wherein generating the second radiation image includes:
transforming the first radiation image according to a ratio of a modulation transfer function of a scintillator included in a radiation detector used to obtain the first radiation image with respect to a modulation transfer function of the scintillator included in the radiation detector used to obtain a radiation image of an object to be examined that is used in the training data;
generating the second radiation image from the transformed first radiation image using the learned model; and
transforming the second radiation image according to an inverse of the ratio.

14. The image processing apparatus according to claim 1, wherein the learned model includes a neural network including a U-shaped configuration that has an encoder function and a decoder function, and the neural network has an adding layer configured to add input data to data that is output from a first convolutional layer on a decoder side.

15. An image processing apparatus comprising:
a processor; and
a memory, including instructions stored thereon, which when executed by the processor, cause the image processing apparatus to:
obtain a first radiation image of an object to be examined; and
by inputting the first radiation image into a learned model, generate a second radiation image in which noise is reduced compared to the first radiation image, wherein the learned model is obtained by training using training data including a radiation image obtained by adding noise of which noise amount of high-frequency components is smaller than noise amount of low-frequency components, wherein the first radiation image is obtained by a radiation detector including a scintillator.

16. An image processing method, comprising:

obtaining a first radiation image of an object to be examined; and generating, by inputting the obtained first radiation image into a learned model, a second radiation image in which noise is reduced compared to the first radiation image, wherein the learned model is obtained by training using training data that includes a radiation image obtained by adding noise with reduced high-frequency components compared to low-frequency components, wherein the first radiation image is obtained by a radiation detector including a scintillator.

17. A non-transitory computer-readable medium having stored thereon a program that, when executed by a computer, causes the computer to execute respective steps of the image processing method according to claim 16.

18. An image processing method comprising:

obtaining a first radiation image of an object to be examined; and generating, by inputting the first radiation image into a learned model, generate a second radiation image in which noise is reduced compared to the first radiation image, wherein the learned model is obtained by training using training data including a radiation image obtained by adding noise of which noise amount of high-frequency components is smaller than noise amount of low-frequency components, wherein the first radiation image is obtained by a radiation detector including a scintillator.

19. A non-transitory computer-readable medium having stored thereon a program that, when executed by a computer, causes the computer to execute respective steps of the image processing method according to claim 18.

* * * * *